United States Patent [19]
Oikawa et al.

[11] Patent Number: 5,855,195
[45] Date of Patent: Jan. 5, 1999

[54] FLOW CONTROL EQUIPMENT FOR AN INTERNAL COMBUSTION ENGINE

[75] Inventors: Shuji Oikawa; Masahiro Sato; Seiji Asano, all of Hitachinaka, Japan

[73] Assignees: Hitachi, Ltd.; Hitachi Car Engineering Co., Ltd., both of Japan

[21] Appl. No.: 860,437

[22] PCT Filed: Dec. 25, 1995

[86] PCT No.: PCT/JP95/02654

§ 371 Date: Jun. 26, 1997

§ 102(e) Date: Jun. 26, 1997

[87] PCT Pub. No.: WO96/20338

PCT Pub. Date: Jul. 4, 1996

[30] Foreign Application Priority Data

Dec. 26, 1994 [JP] Japan .................................. 6-322429
Jan. 30, 1995 [JP] Japan .................................. 7-012302

[51] Int. Cl.$^6$ .................................................. F02M 3/00
[52] U.S. Cl. ...................................................... 123/339.25
[58] Field of Search .............................. 123/339.25, 397, 123/399, 360, 333, 342, 695; 318/561; 137/81.5, 625.65, 486; 361/154

[56] References Cited

U.S. PATENT DOCUMENTS

| | | | |
|---|---|---|---|
| 3,608,572 | 9/1971 | Hass ........................................ | 137/81.5 |
| 4,282,467 | 8/1981 | Gruesbeck ............................... | 318/561 |
| 4,679,585 | 7/1987 | Ewing ...................................... | 137/486 |
| 4,737,882 | 4/1988 | D'Onofrio ................................ | 361/154 |
| 4,771,750 | 9/1988 | Breitkreutz et al. ..................... | 123/339 |
| 4,793,377 | 12/1988 | Haynes et al. ......................... | 137/625.65 |
| 4,796,580 | 1/1989 | Wakeman ................................. | 123/339 |
| 4,995,363 | 2/1991 | Terazawa et al. ....................... | 123/399 |
| 5,014,667 | 5/1991 | Meyer ...................................... | 123/360 |
| 5,048,482 | 9/1991 | Kratt et al. .............................. | 123/333 |
| 5,065,718 | 11/1991 | Suzuki et al. ........................... | 123/339 |
| 5,199,401 | 4/1993 | O'Neill et al. .......................... | 123/342 |
| 5,222,471 | 6/1993 | Stueven ................................... | 123/695 |
| 5,235,951 | 8/1993 | Taguchi et al. ......................... | 123/397 |
| 5,239,961 | 8/1993 | Neidhard et al. ....................... | 123/339 |
| 5,606,950 | 3/1997 | Fujiwara et al. ........................ | 123/399 |

FOREIGN PATENT DOCUMENTS

| | | | |
|---|---|---|---|
| 57-54613 | 4/1982 | Japan ................................ | 123/339.25 |
| 1-316581 | 12/1989 | Japan ................................ | 123/339.25 |
| 05-137297 | 6/1993 | Japan ................................ | 123/339.25 |

*Primary Examiner*—Raymond A. Nelli
*Attorney, Agent, or Firm*—Evenson, McKeown, Edwards & Lenahan, P.L.L.C.

[57] ABSTRACT

A flow controller in a flow control valve for an internal combustion engine. When the flow control valve is operated in a closing direction upon the occurrence of an abnormal state in the flow control valve such as sticking, resonance frequency vibration is applied to the valve so that a sliding resistance force of a screw mechanism can be lowered and the valve can be closed. To prevent problems with the flow control valve such as being out-of-control, a setting time is added to a drive period according to the variation in the motor torque. Because the flow control valve can be reliably closed, and an out-of-control condition of the flow control valve can be prevented, an incorrect operation of the engine can be avoided.

17 Claims, 23 Drawing Sheets

| PHASE<br>STEP | $\phi A$ | $\overline{\phi A}$ | $\phi B$ | $\overline{\phi B}$ |
|---|---|---|---|---|
| 1 | ON | ON | | |
| 2 | | ON | ON | |
| 3 | | | ON | ON |
| 4 | ON | | | ON |

VALVE OPEN DIRECTION ↑
VALVE CLOSE DIRECTION ↓

FLOW CONTROL EQUIPMENT FOR AN INTERNAL COMBUSTION ENGINE

TECHNICAL FIELD

The present invention relates to a flow control equipment with a flow control valve, for an internal combustion engine.

BACKGROUND ART

As a control equipment for flow parameters on engine control, there are an ISC control equipment for controlling an auxiliary intake air amount to maintain an idling speed at a constant, an EGR control equipment for controlling an amount of circulation of exhaust gas to improve the fuel consumption or decrease Nox included in the exhaust gas, an evaporation control equipment for inhibiting the emission of the fuel evaporated from a fuel tank to air, and so on.

When the flow control equipment suffers a breakdown or when the flow control valve becomes out of order, an engine trouble occurs due to an abnormal increase in an idling speed, an occurrence of surge from instability of combustion, and abnormality (over-rich or over-lean) of air/fuel(A/F)ratio.

Especially, in order to address the emission regulation or the fuel-consumption regulation, a large amount of EGR and a large amount of evaporation-purge have been performed. Failures of their control units are directly relevant to engine stall, which not only hurts driver's feelings, but also very dangerous.

Accordingly, there are generally provided a control unit for preventing the out-of-control and another control unit for performing an evasion control (a fail-safe control) when a failure occurs. In the well-known technique, the safety can be maintained during running by fully closing a control system (ex. cutoff of an EGR pass) using, for example, an EGR ON-OFF valve (cut valve) when the failure is detected.

Further, in the prior art of the prevention of out-of-control in which a flow control valve driven by a motor is used, the function of fail-safe has not been considered. Therefore, such a failure sometimes occurs, in which an output signal is not provided to the motor. The setting time is provided only when a driving direction of a synchronous motor is switched in such a prior art.

Furthermore, as the setting time, different values are used according to a state of the variation in a motor torque, thereby preventing the deterioration of response.

When the control unit use not a cut valve, but an electromagnetic valve, the prior art equipment for evasion control is provided with two system of drive circuits for a flow control valve (if compared with an EGR valve using a step motor, a bipolar system). Therefore, when the flow control valve becomes not to generate the desired propelling force and it becomes difficult to control the flow control valve by using the drive circuit, such a flow control equipment can fully close the flow control valve by switching to the other system of drive circuit, thereby obtaining the desired propelling force necessary to drive the flow control valve. Such a flow control equipment is disclosed, for example, in Japanese Patent Laid-Open No. 4-301170. However, the drive circuit switching system is complicated and expensive.

There is known a method using a spring for returning the control valve, instead of the cut valve. Such a method is disclosed in Japanese Patent Laid-Open No. 1-316581.

The conventional return-spring method must have a strong return-spring which overcomes the friction of a screw and bulb sludge (which has an effect on the stick of the flow control valve), as a fail-safe function when the flow control equipment becomes abnormal. Therefore, there is a fear of out-of-control when the flow control valve is controlled, in addition to complicated mechanism and high manufacturing cost.

Further, while it is possible to prevent the deterioration of response by suppressing the control of the prevention of out-of-control to be the necessary and minimum amount, with maintaining the safety during running by preventing the out-of-control, the conventional return-spring method has no fail-safe function against the failure of the flow control equipment when the output signal is not provided to the motor.

DISCLOSURE OF INVENTION

In order to solve the above-mentioned problems, a flow control equipment according to the present invention has a return spring incorporated in the flow control valve, thereby providing vibration with a resonance frequency when the flow control equipment becomes to be out of order, and the flow control valve is shifted to a closing direction.

The present invention further has means for providing single-side stress on a valve component of the flow control valve driven by the motor, and means for determining the variation in a motor torque to set at least two setting time on a drive period according to a state of the variation in the torque of a synchronous motor obtained from the torque variation determining means.

According to the present invention, it is possible to eliminate the effect of sliding resistance of a screw mechanism which disturbs the close of the flow control valve, when the abnormality of the control unit for fluid control is detected. As a result, it becomes possible to close the flow control valve with an appropriate operation, and thus avoid the trouble of operation of an engine.

even in the failure of the flow control unit in which an output signal is not provided to the motor, it is possible to close the flow control valve, and thus avoid the over-applying of an EGR, an auxiliary intake air, purge of evaporation, and so on. Further, it becomes possible to prevent the out-of-control by adjusting the setting time to the drive period according to the variation in a motor torque and to prevent the deterioration of response by selecting one setting time from at least two values.

BEST MODE FOR CARRYING OUT THE INVENTION

A flow control equipment for an engine according to an embodiment of the present invention will be explained hereinafter with reference to drawings attached hereto.

Figure 1:
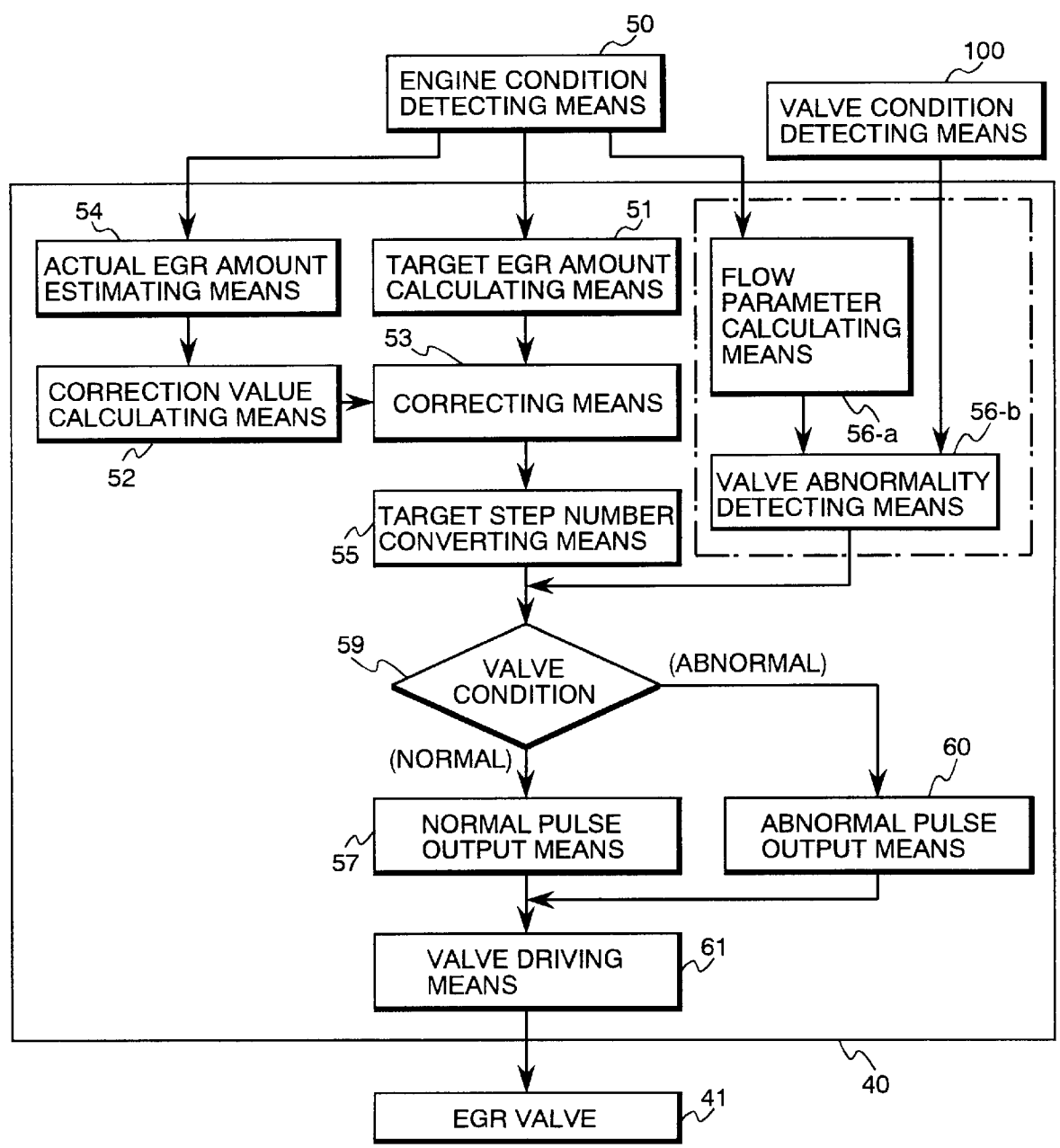
FIG. 1 is a block diagram illustrating a method of controlling the exhaust gas circulating unit of the present invention.

FIG. 1 is a block diagram illustrating a method of controlling the exhaust gas circulating unit of the present invention.

A control unit 40 inputs an engine speed, an amount of intake air, etc. from an engine condition detecting means 50(various sensors), and then calculates the target EGR amount by a target EGR calculating means 51.

Where, the control unit 40 recognizes the condition of operation of a vehicle and/or the condition of load by using information of various kinds of sensors, ex. an engine speed, an engine water temperature, throttle opening, and controls the passing (or increase of flow) and the interruption (or decrease of flow) of the EGR according to the drive condition and/or the load condition.

Further, actual EGR amount estimating means 54 in the control unit 40 estimates the actual EGR amount by using a pressure in an air intake pipe, and a throttle opening and an engine speed input to the control unit. The target EGR amount calculated in the target EGR amount calculating means 51 is amended by using the correlation between the estimated value and the calculated target EGR amount (Block 53). The amended target EGR amount is converted into the target step number corresponding to the target EGR amount by target step number converting means 55. Valve driving means 61 comprises step-motor-driving-pulse output means 57 for determining a drive output period and a drive output pattern, and a driving unit including transistors, etc. The valve driving means 61 outputs an output signal along the predetermined excitation pattern, thereby controlling EGR valve 41 according to the target step number.

Next, when an exhaust gas circulating unit determines that the valve condition is abnormal, the exhaust gas circulating unit controls in the following way.

The information from the engine condition detecting means 50 or various kinds of sensors is input to block 56. In block 56, flow parameters (ex. temperature, pressure) relevant to the EGR flow controlled by the valve are calculated in block 56a. The flow parameters are compared with the predetermined threshold value, and the abnormality of the valve is detected.

While, the electrical abnormality of the EGR valve, for example, the disconnection of coil and the mixing of noises, is detected in the following way. An output signal to the EGR valve, including a valve lift amount used for the detection of the control amount, is detected by valve condition detecting means 100. An output signal of the detecting means 100 is input to the control unit 40, in which whether or not the connection state and the drive condition is, respectively, in the predetermined state and in the predetermined operation pattern is detected by valve abnormality detecting means 56b.

The detected result is input to valve condition switching means 59 provided between blocks 55 and 57. If the result is normal, the target step number converted by the target step number converting means 55 is output to step-motor-driving-pulse output means 57 and valve driving means 61, and the EGR valve 41 is driven in a normal way. Otherwise, the target step number is output to block 60 through the switching means 59. In block 60, the target step number is compulsorily reset to "0" or a value close to "0" (i.e. full closing), independently of the target step number converted by the target step number converting means 55, and the EGR valve is fully closed, with driving the EGR valve to a closing direction and mixing a special frequency (resonance frequency) to decrease the sliding resistance. This operation will be explained later in detail.

Figure 2:
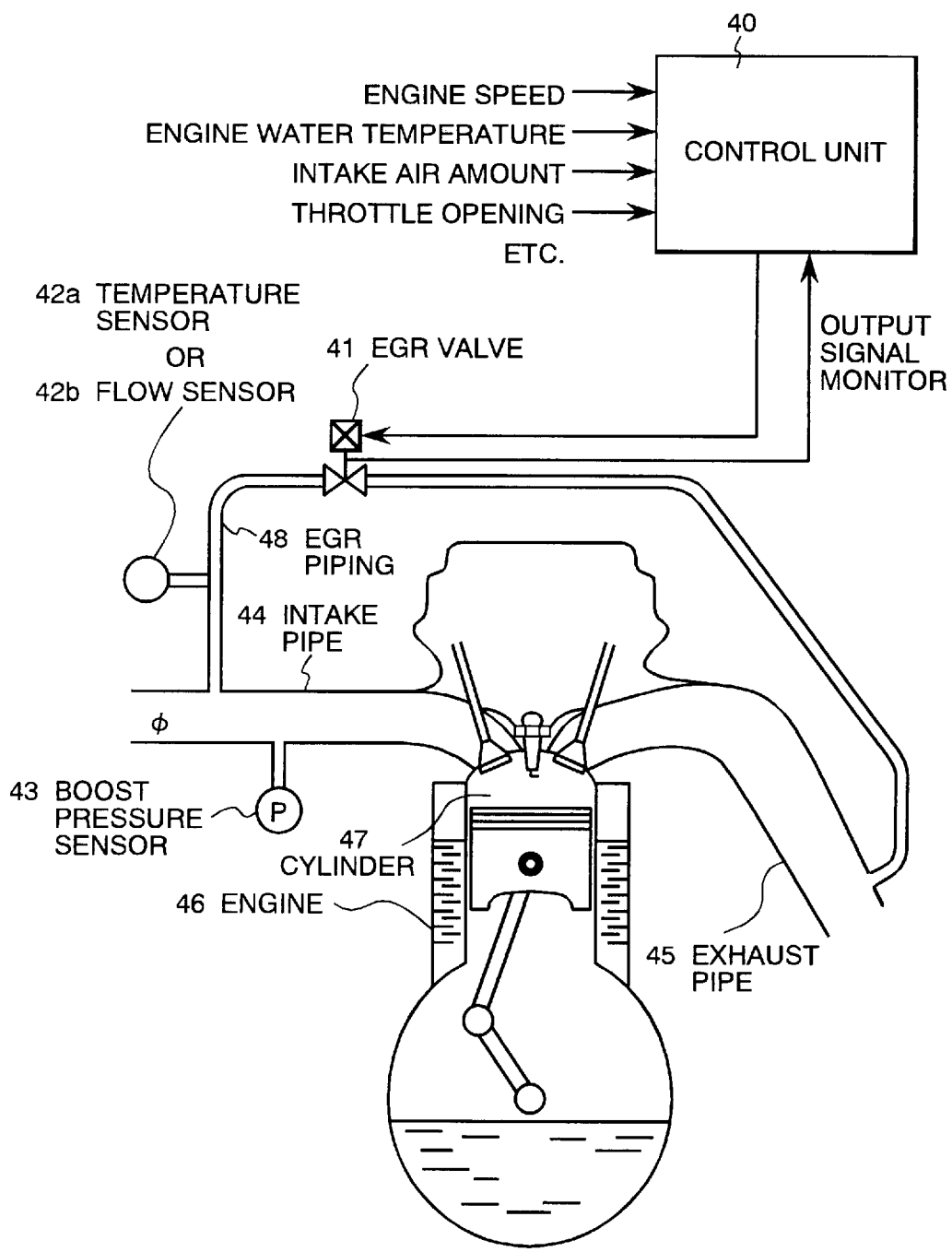
FIG. 2 shows the whole configuration of an exhaust gas circulating unit of the present invention.

FIG. 2 shows the whole configuration of an exhaust gas circulating unit of the present invention.

The mixed air of the intake air and the fuel passes cylinder 47 through intake pipe 44, burns in the cylinder 47, and is emitted to exhaust pipe 45 as exhaust gas. At this time, a portion of the exhaust gas is circulated to the intake pipe 44 through an EGR valve 41 or a flow control valve. As a result, Nox included in the exhaust gas can be decreased and the percentage of fuel consumption can be improved.

Where, the control unit 40 inputs parameters indicative of the drive condition of the engine 46, an engine speed, an engine water temperature, an intake air amount, throttle opening, etc., calculates the controlled variable corresponding to the drive condition of the engine 46, and provides an output signal to the EGR valve 41.

It is possible to detect an amount of the circulation of exhaust gas (namely, the EGR amount) by using a boost pressure sensor 43 (an intake pipe inside sensor) mounted on the intake pipe 44, or a temperature sensor 42*a*, a flow sensor 42*b*, etc., mounted on an EGR piping 48. The state of the electric connection of the EGR valve can be monitored by using the output signal provided to the EGR valve.

Figure 3:
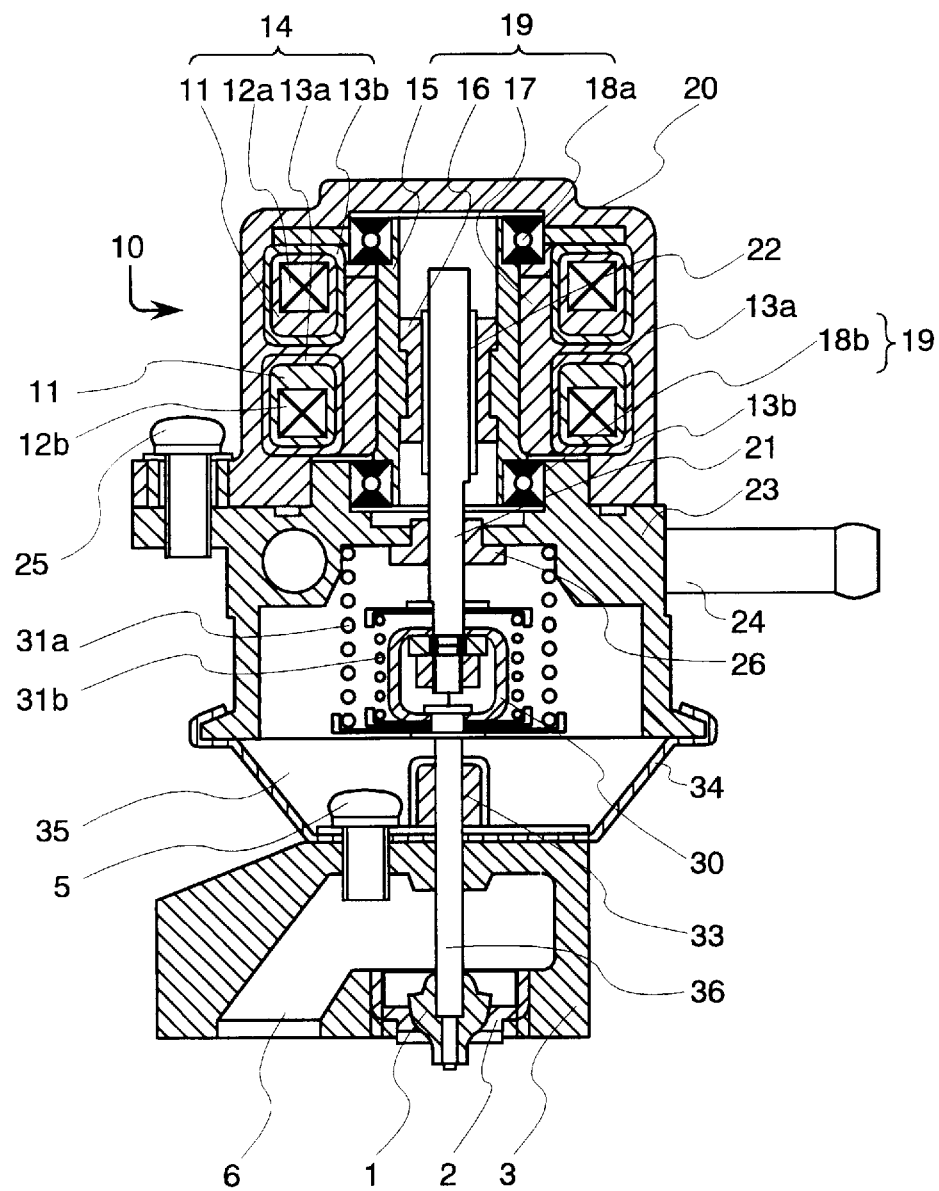
FIG. 3 shows the configuration of a step motor type EGR valve which is an example of a flow control valve in the flow control unit.

FIG. 3 shows the configuration of a step motor type EGR valve which is an example of a flow control valve in the flow control unit.

A stator portion 14 of the step motor 10 is constructed of coils 12*a* and 12*b* wound around bobbin 11, and teeth portions 13*a* and 13*b* formed around the periphery of the bobbin 11. While, a rotor portion 19 is constructed of a magnet holder 15, a magnet 17 and two bearings 18*a*, 18*b* fixed around the periphery of the magnet holder 15, and a female screw 16 formed inside the magnet holder 15. The stator portion is fixed to a bearing housing 23 by motor connection screw, which has cooling-water circulating pipe 24 provided so that the cooling water can circulate. The bearing 18*a* bonded at the top of the magnet holder 15 is pre-pressured by a bearing pre-pressured spring 20. While, bearing 18*b* at the bottom of the holder 15 is supported by a bearing housing 23. In order to convert the rotational motion of the rotor portion 19 to the rectilinear motion of a power shaft 21, the female screw 16 is formed inside the magnet holder 15, and the male screw 22 is formed on the power shaft 21. The power shaft 21 is connected to the bearing housing 23, and pierce a axis bush 26 of which piercing face is crescent-shaped to restrain the rotation of the power shaft 21. One of valve axes 36 is connected to the power shaft 21 by an axis joint 30, the other pierces a gas seal 33 and a motor holder 34 having a space 35 through which allows an air to pass, and is connected to valve 1 for opening and closing a valve seat 2. The force of springs 31*a* and 31*b* act to allow the valve to close. A body 3 having the valve seat 2 and forming a fluid passage is connected to the motor holder 34 connected to the bearing housing by a body connecting screw 5.

When the coils 12*a* and 12*b* is excited by an electric pulse signal, the magnet 17 is induced and rotated. As a result, the rotor portion 19 rotates. The rotation of the rotor portion 19 is converted to the rectilinear motion of the power shaft 21 by the male screw 22 and the female screw 16. The rectilinear motion is transferred to a valve axis 36 through the axis joint 30. Thereby, an amount of the exhaust gas passing through a circulation passage 6 is controlled by the space between the valve 1 and the valve seat 2.

Where, if the load of the springs 31*a* and 31*b* is set to allow the valve 1 to close at the time when the propelling force due to the coil 12 does not exist, it is necessary to set the load of the spring stronger than the reaction force of the coil 12. Therefore, because the margin of the coil propelling force against the load of the spring becomes small or becomes lack when the valve is driven, the actual control variable is liable to depart from the desired target control variable for the valve owing to the external disturbance such as a circumference temperature, vibration only when the flow control equipment is in a normal state. Further, even if it increases the driving frequency for the flow control valve, it is liable to depart from the target control variable as in the above-mentioned case. It is, therefore, impossible to set the spring load so that the valve can be fully closed without the propelling force due to the coil. In the present time, it is essential to lessen the spring force in order to prevent the occurrence of the out-of-control. However, it becomes impossible fully to close the valve only by the spring force when the valve is in a abnormal state. Accordingly, when taking the safety into consideration, it is not best way.

Figures 4, 5:
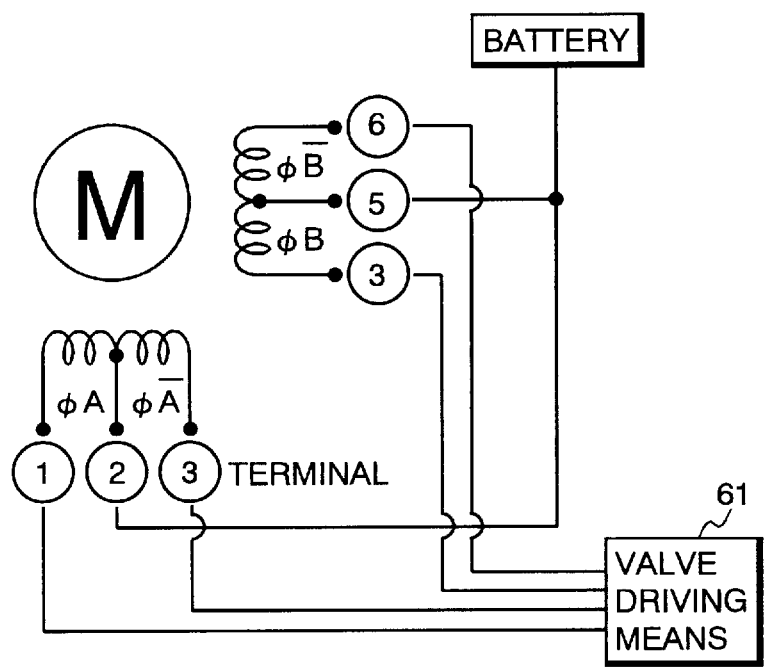
FIG. 4 shows the wiring in a unipolar drive unit for the step motor type EGR valve.
FIG. 5 shows an exciting pattern in a unipolar drive unit for the step motor type EGR valve.

FIG. 4 shows the wiring in a unipolar drive unit for the step motor type EGR valve, and FIG. 5 shows an exciting pattern in the same unit.

In FIG. 4, terminals 2 and 5 is connected to a battery (a drive power source). It is possible to generate the exciting pattern shown in FIG. 5 by short-circuiting electric potentials at terminals 1, 3, 4 and 6 through a valve drive means 61 in a control unit 40. Further, by changing the exciting patterns, it is possible to rotate a rotor portion 19 and drive the control valve in a up or down direction (in a open or closing direction).

The case in which the EGR circulating system departs from the normal function, that is, the imbalance of the force at the time when the valve is driven in a closing direction and when stick of the valve, choking or leakage of the system etc., occurs, will be explained hereinafter with reference to FIG. 6.

Figure 6:
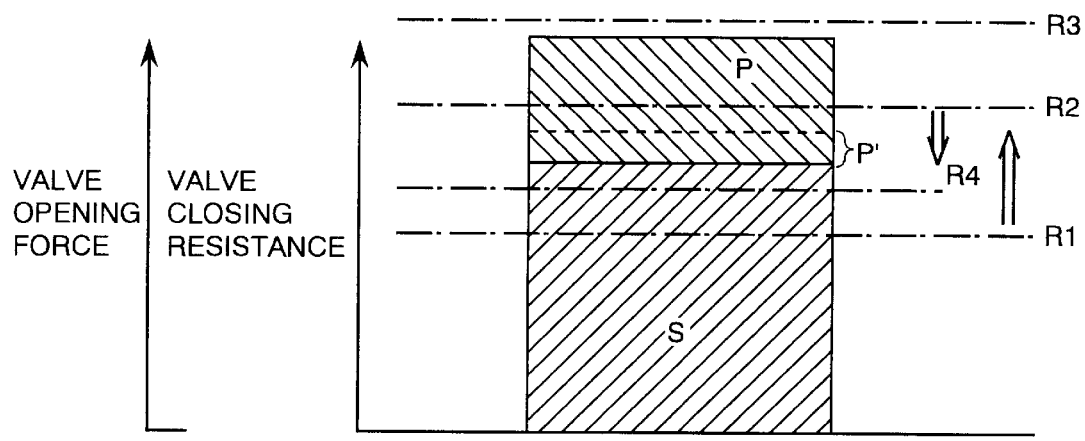
FIG. 6 is a graph showing the relationship between a valve closing force and a valve closing resistance.

In FIG. 6, the ordinate indicates force for closing the valve (valve closing force), and resistance force at the time when the valve is closing (valve closing resistance). In case that an engine is in a off-line (in a brand new car), the valve closing force is the sum of valve closing force S due to the return spring and valve closing force P due to the excitation of the coil, and larger than an initial valve closing resistance R1. It is, therefore, enough to close the valve. Since there is a fear that the step motor becomes out of control, it can not set the force S so large.

In a long time use, a valve closing resistance increase to a resistance R2, according to the increase of wear of a bearing of the valve shaft and the sliding resistance of a screw portion for converting the rotation of the rotor into the motion of an axis direction. Therefore, the clearance against the valve closing force decreases, finally the resistance R2 becomes over P+S. It therefore becomes difficult to close the valve. (While it equals to R3 in FIG. 3, they does not equal in an actual equipment).

Even if the valve closing resistance equals to the resistance R2, it becomes difficult to maintain the desired valve closing force when the valve falls into an abnormal state, for example, the decrease of the drive force due to deterioration of the coil, the disconnection in any of the phases of the coil. As a result, the valve closing force due to the excitation of the coil decreases from P to P', and thus it becomes impossible to close the valve.

In the present invention, we have noted that a large part of the valve closing resistance is occurred based on mechanical factors such as the sliding resistor of a screw, the resistance of a bearing of a shaft, etc. Further, by driving the valve with the resonance frequency (intrinsic vibration mode inherent in the valve) and temporally producing resonance in the valve, eliminating the valve closing resistance caused by the mechanical factors (enlarging the back rush of the screw portion with vibration ), and decreasing from R6 in FIG. 6 to R2, it is possible fully to close the valve by the force of the return spring, even when the EGR system is in an abnormal state.

Figure 7:
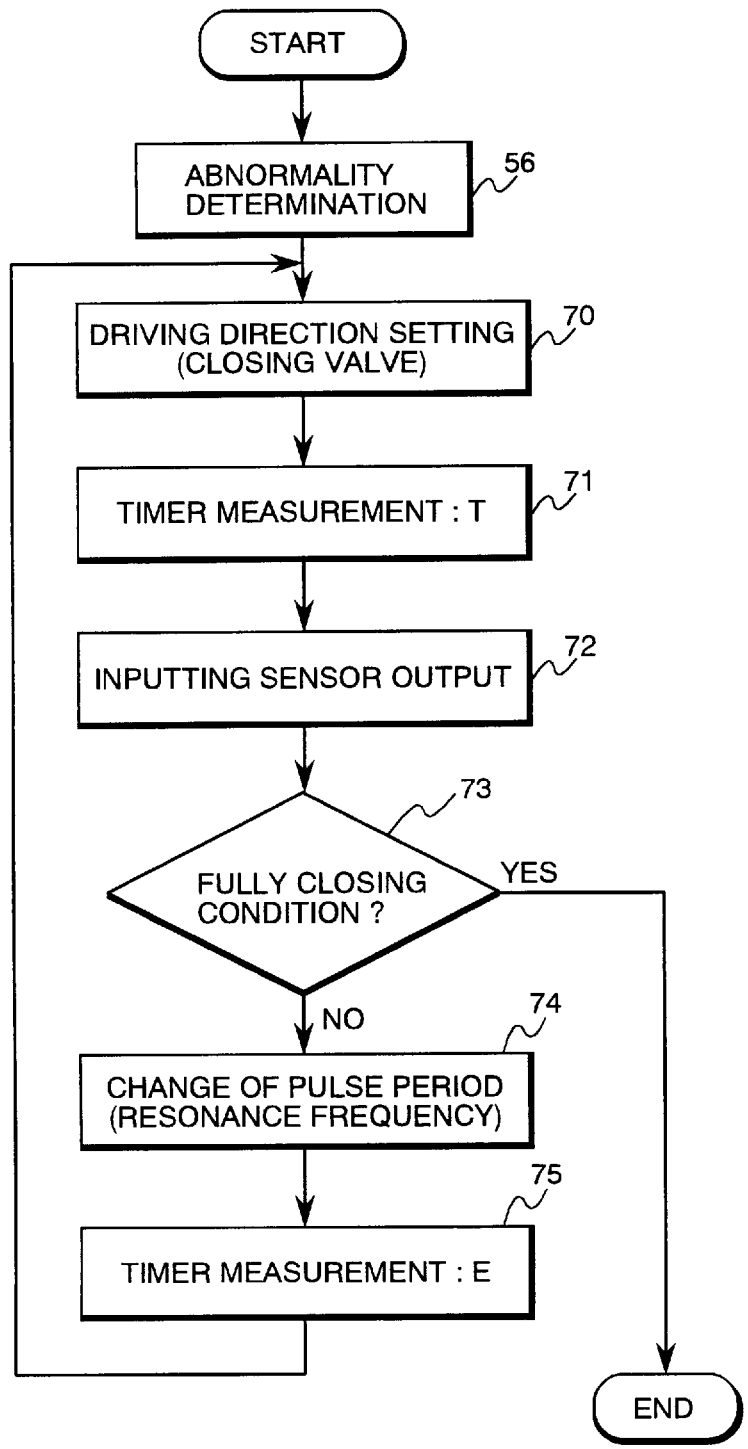
FIG. 7 is a flow chart illustrating a method for closing the flow control valve by using the resonance drive.
Figure 8:
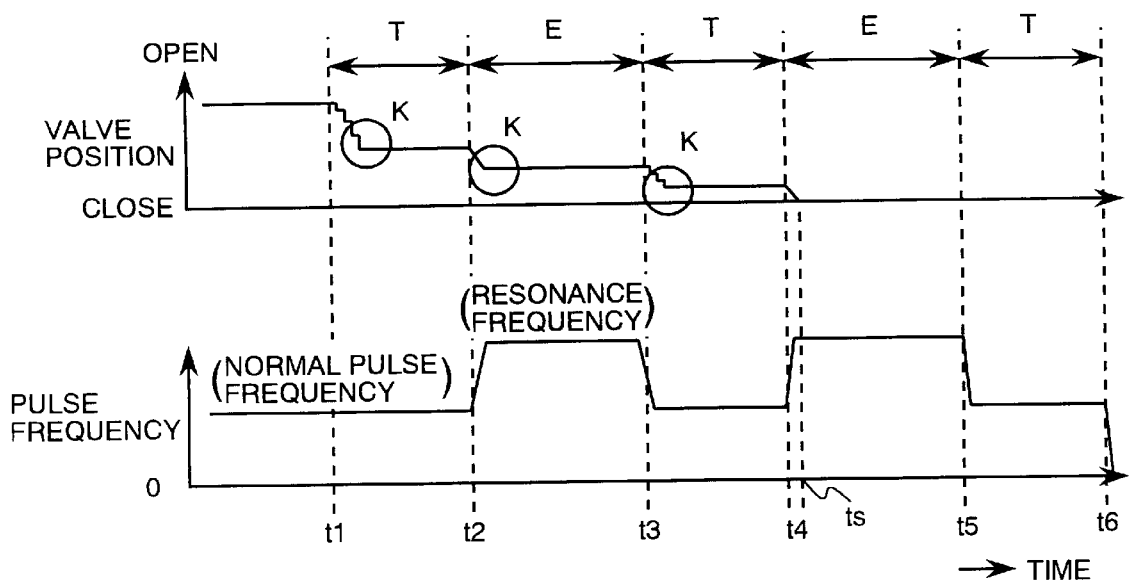
FIG. 8 is a timing chart along which the flow chart shown in FIG. 7 is carried out.

FIG. 7 is a flow chart illustrating a method for closing the flow control valve by using the resonance drive, and showing an example of block 60 in FIG. 1. FIG. 8 is a timing chart along which the flow chart shown in FIG. 7 is carried out.

Referring now to FIG. 7, if the abnormality is determined in step 56, a driving direction is switched to a valve closing direction in step 70. An output period (frequency) of a pulse output is equal to a normal pulse period. Thereby, it is possible quickly to close the valve with the driving force and the safety being maintained. Next, time T is measured in step 71, then the processing is shifted to step 72 after the time T lapsed.

In step 72, a state (open information) of the close of the valve is detected by using a lift sensor of the valve, and a flow sensor, a pressure sensor and a temperature sensor mounted on the EGR circulation passage. If a fully closed state is detected in step 73, then the processing finishes. Otherwise, the processing advances to step 74, in which the pulse output period is set to around the resonance frequency, and the closing operation is performed. In step 75, the resonance driving time E is measured, the closing operation keeps on performing by using the resonance frequency until the time E lapses.

The processing advances again to step 70, in which the closing operation is performed, and this flow is repeated until the valve is fully closed. It should be appreciated that it may be possible to add the processing of steps 72 and 73 between steps 75 and 70. A fully closed state can be easily determined from flow parameters and valve lift.

FIG. 8 shows the above-mentioned operation of FIG. 7. In FIG. 8, the time intervals between t1 and t2, t3 and t4, and t5 and t6 are sections of the measurement time T driven by the normal pulse frequency. Further, the time intervals between t2 and t3, and t4 and t5 are sections of the measurement time E driven by the resonance frequency. The K portion of the valve position represents the state in which the valve is sticking owing to the sliding resistance of the shaft and a screw of the valve. The valve is returned to a fully closed state, repeatedly performing the flow of FIG. 7. Further, instead of step 70 of FIG. 7, the valve may be opened only by the return spring in a non-exciting state. It should be also appreciated that in order to decrease the manufacturing cost the steps 72 and 73 may be eliminated and the flow of FIG. 7 may be repeated by the predetermined times.

Figure 9:
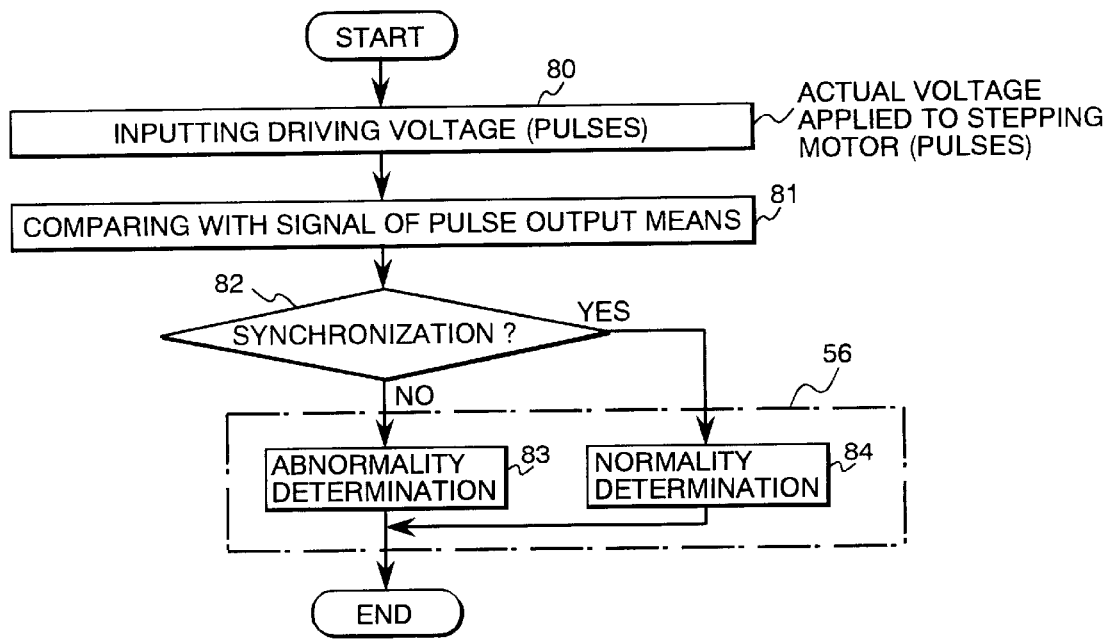
FIG. 9 is an example of a flow of the operation carried out by an abnormality determining means shown in FIG. 1.
Figure 10:
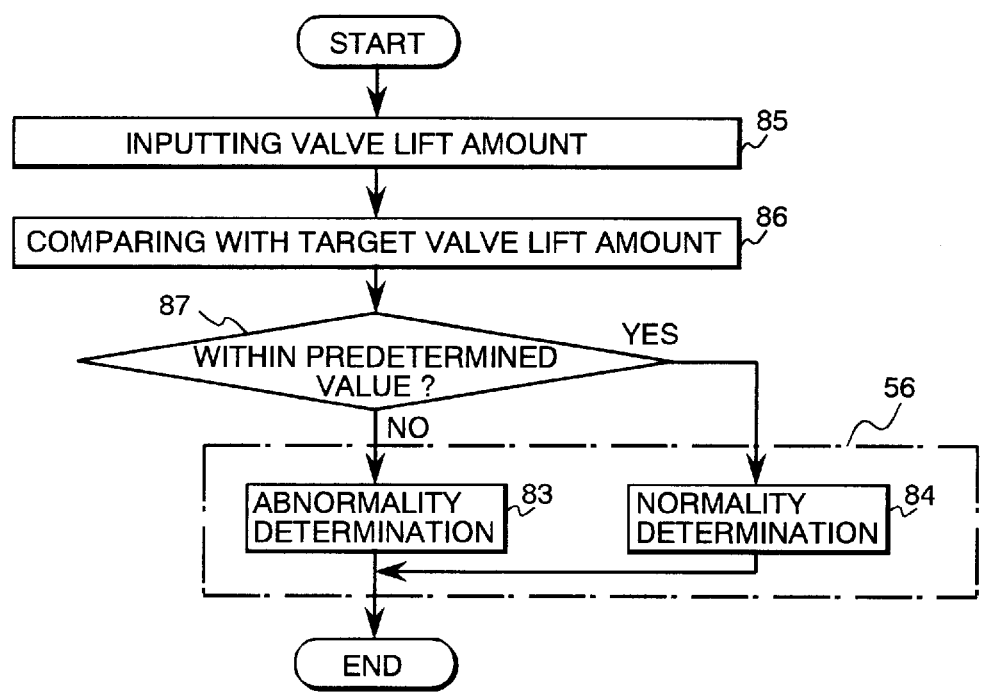
FIG. 10 is another example of the flow of the operation carried out by the abnormality determining means shown in FIG. 1.
Figure 11:
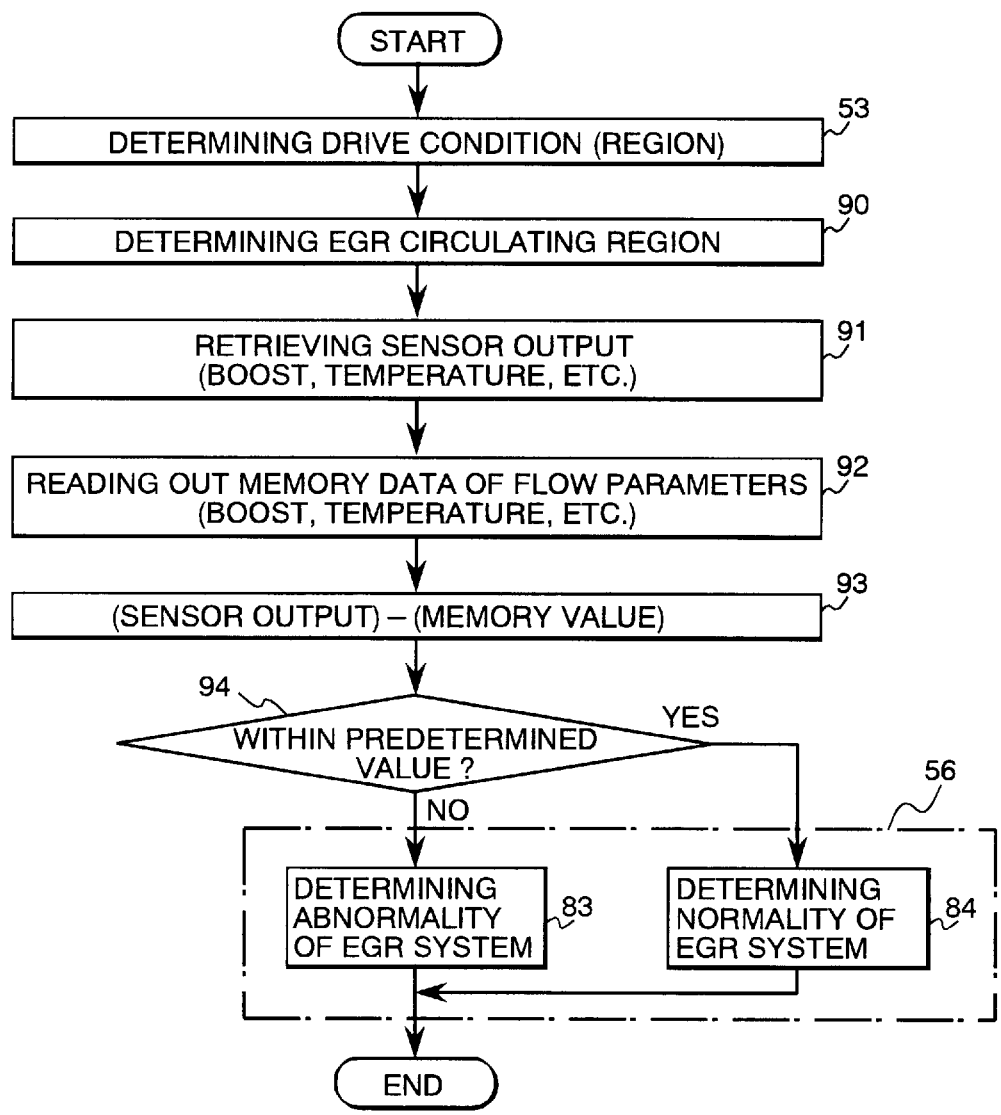
FIG. 11 is a further example of the flow of the operation carried out by the abnormality determining means shown in FIG. 1.

FIG. 9, FIG. 10 and FIG. 11 show examples of a flow of the operation carried out by an abnormality determining means shown in FIG. 1.

Referring first to FIG. 9, in order to check whether or not an output from the valve driving means 61 of FIG. 1 is correctly applied to the valve, an applied voltage pulse of each coil of the step motor is input at a timing of the output of the valve driving means 61 in step 80. In next step 81, whether or not the applied voltage pulse is synchronized with the output timing of the valve driving means 61. It may be possible to check the matching of high and low levels of the electric potentials.

If they are in synchronism with each other, the processing advances to step 56, then it is determined in step 84 that the valve is in a normal state. Otherwise, it is determined in step 83 that the valve is in an abnormal state. While FIG. 10 also shows a flowchart, in FIG. 10 a shift amount (lift amount) sensor is provided in the valve shaft portion or in the rotor portion to detect the abnormality of the valve by the comparison of the actual lift amount and the target valve lift amount preset or calculated every operation regions of an engine.

Since the driving force decreases when the valve is in the abnormal state, it is easier to detect the abnormality of the valve in a valve opening direction which is opposite to a direction of the force of the return spring.

FIG. 11 is a flow chart to detect such an abnormality as the choking or leakage of the EGR circulation passage. In the flow chart of FIG. 11, the passing-through of the EGR gas is detected every operation regions (drive conditions). First, the drive condition (region) is determined in step 53, then whether or not the region is the EGR circulation region is determined in step 90.

In step 91, outputs from sensors of the EGR flow, temperature, pressure, etc. is input. The values pre-stored in a memory and corresponding to the above sensors in the pertinent region is read out in step 92. Both of the output from the sensor and the pre-stored value are compared with each other, and the difference is calculated, in step 93. If the correlation value (or difference) is smaller than the predetermined value, then it is determined that the EGR system is normal in step 84. Otherwise, it is determined abnormal.

By using the above-mentioned method, it is possible suitably to close the valve only when abnormal, and thus maintain the safety of an engine or vehicle.

It should be appreciated that the present invention can be used together with an abnormality alarm such as a buzzer, an alarm light, an electric communication unit connected outside the control unit.

It should be also appreciated that the above-mentioned embodiment is applicable to not only an EGR control, but also an ISC control or an evaporation control.

According to the present invention, by incorporating the return spring in the flow control valve, shifting the flow control valve to a closing direction when the flow control equipment departs from the normal operation, and providing the resonance vibration, it is possible to eliminate the effect of the sliding resistance of a screw mechanism which interrupts the closing operation of the flow control valve.

An exhaust gas circulating equipment or EGR control equipment according to another embodiment of the present invention will be explained with reference to the attached drawings.

Figure 12:
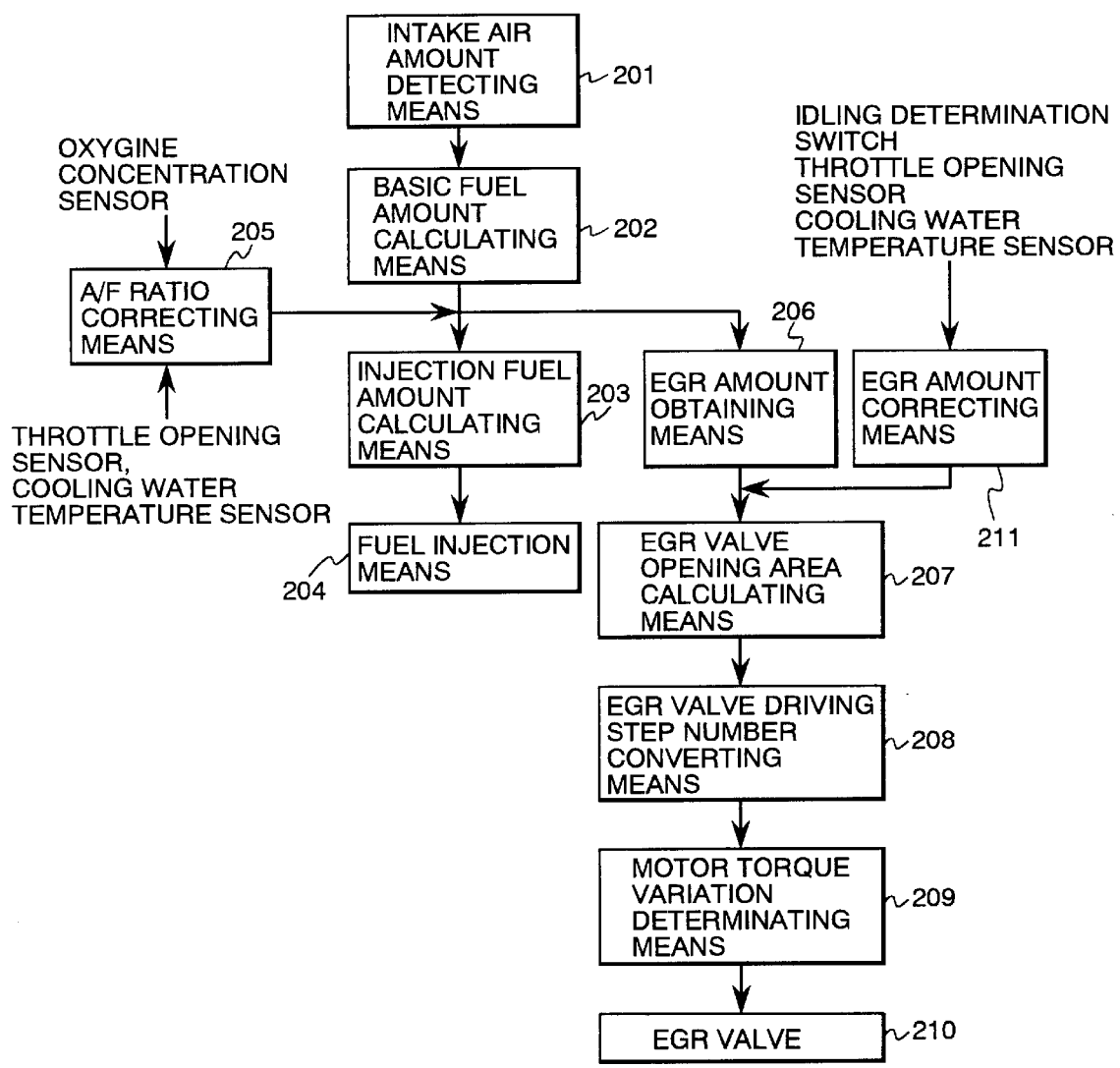
FIG. 12 is a block diagram showing an example of the whole configuration of the EGR control unit.

FIG. 12 is a block diagram showing an example of the whole configuration of the EGR control unit.

A basic fuel amount is calculated at a basic fuel amount calculating means 202, using an intake air amount calculated at an intake air amount detecting means 201 and an engine speed. While, in order to obtain an arbitrary air/fuel ratio corresponding to a drive condition, the oxygen concentration contained in the exhaust gas is detected and the concentration of the air/fuel ratio is determined. Next, a correction coefficient for the air/fuel ratio is calculated from the determined result and a load condition for the engine at an A/F ratio correcting means 205. An injection amount of the fuel is obtained as a "duty" from the basic fuel amount and the correction coefficient for the A/F ratio at an injection fuel amount calculating means 203, and the corresponding fuel is injected by a fuel injection means.

Figure 18:
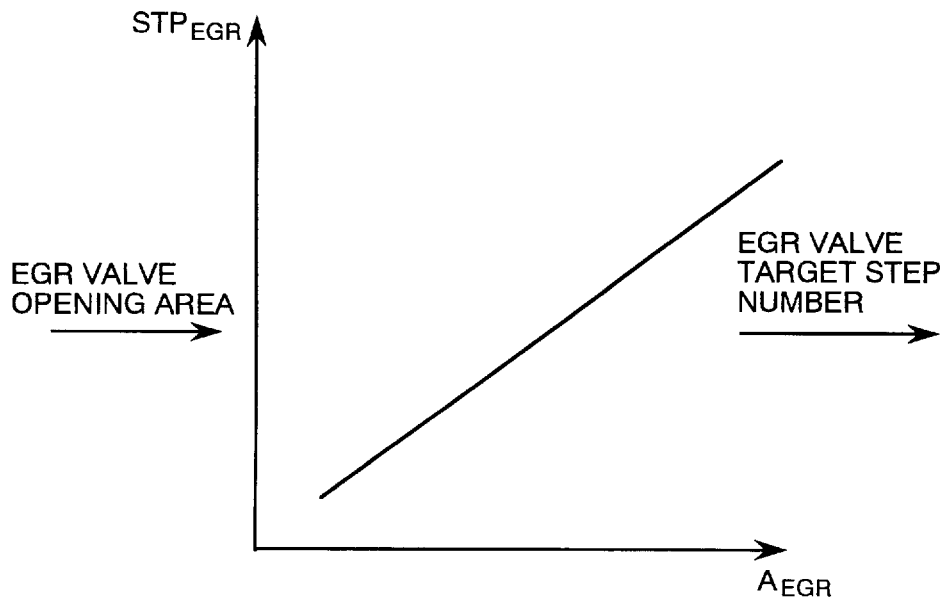
FIG. 18 is a graph showing the relationship between the opening area of the EGR valve and the target step number for the EGR valve.
Figure 19:
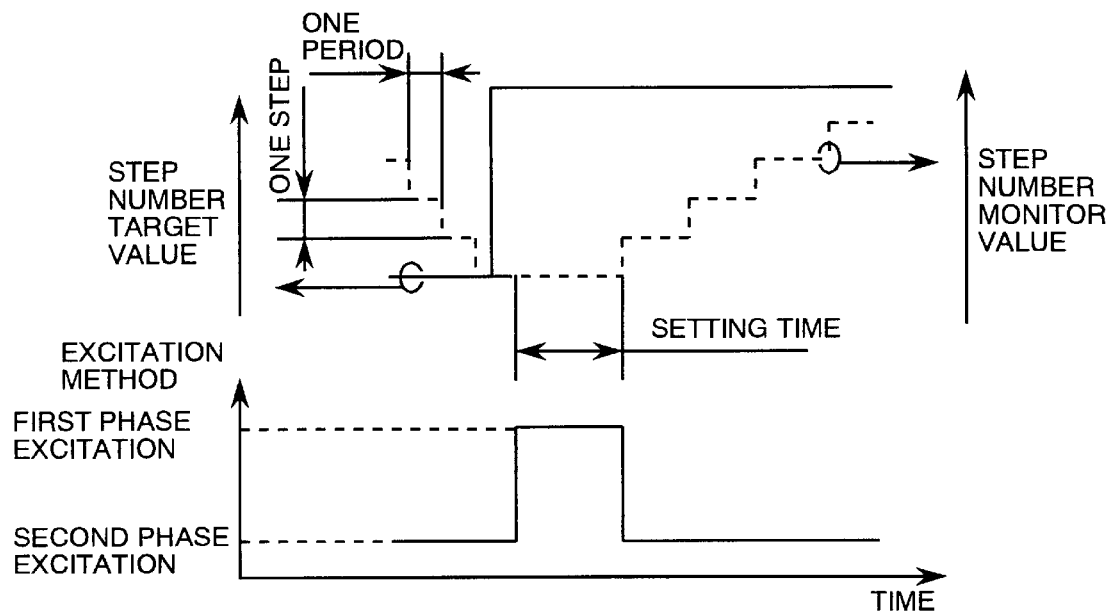
FIG. 19 is a graph showing the relationship between an excitation state and the setting time at the time when the step number of the EGR valve changes from a large value to a small value and from the small value to a large value.

After an amount of circulation of the exhaust gas or EGR amount is map-retrieved by using the basic fuel amount and the engine speed at an EGR amount obtaining means 206 as shown in FIG. 18, the EGR amount is corrected by using the information of the load condition for the engine, i.e. a cooling water temperature sensor, a throttle opening sensor and an idling determining switch at an EGR amount correcting means 211, and then it is converted into an EGR valve opening area calculating means 207. Further, after the converted EGR valve opening area is converted into the number of an EGR valve driving step at an EGR valve driving step number converting means 208 as shown in FIG. 19, an output signal along the predetermined excitation pattern is output by a synchronous motor driving pulse outputting means, in order to control the EGR valve 210 driven by a synchronous motor. When the variation in torque of the motor is detected by the motor torque variation determining means 209, a setting time is added to the output signal and the result of the addition is input to the EGR valve 210.

Figure 13:
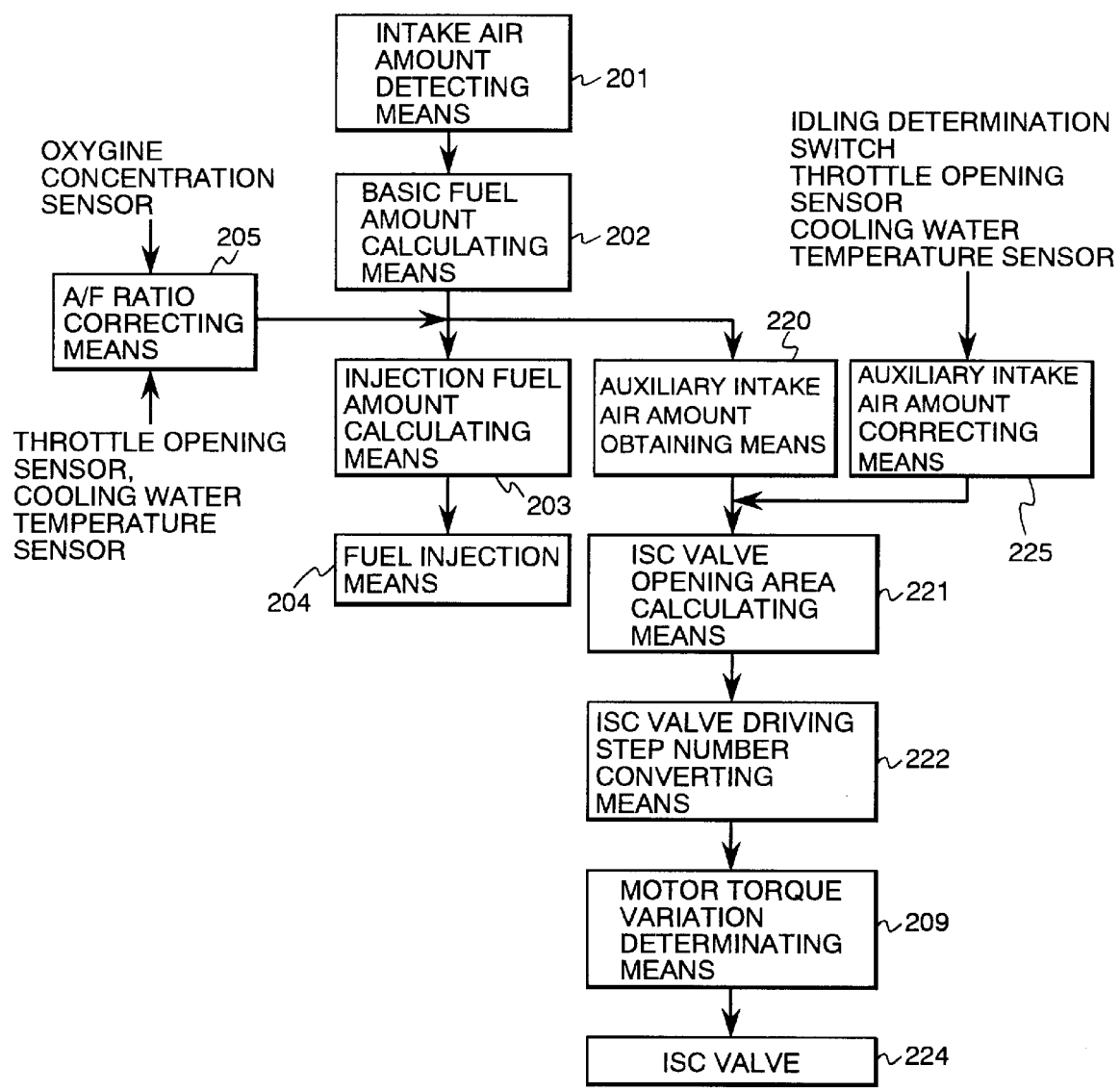
FIG. 13 is a block diagram showing an example of the whole configuration of an ISC control unit.
Figure 14:
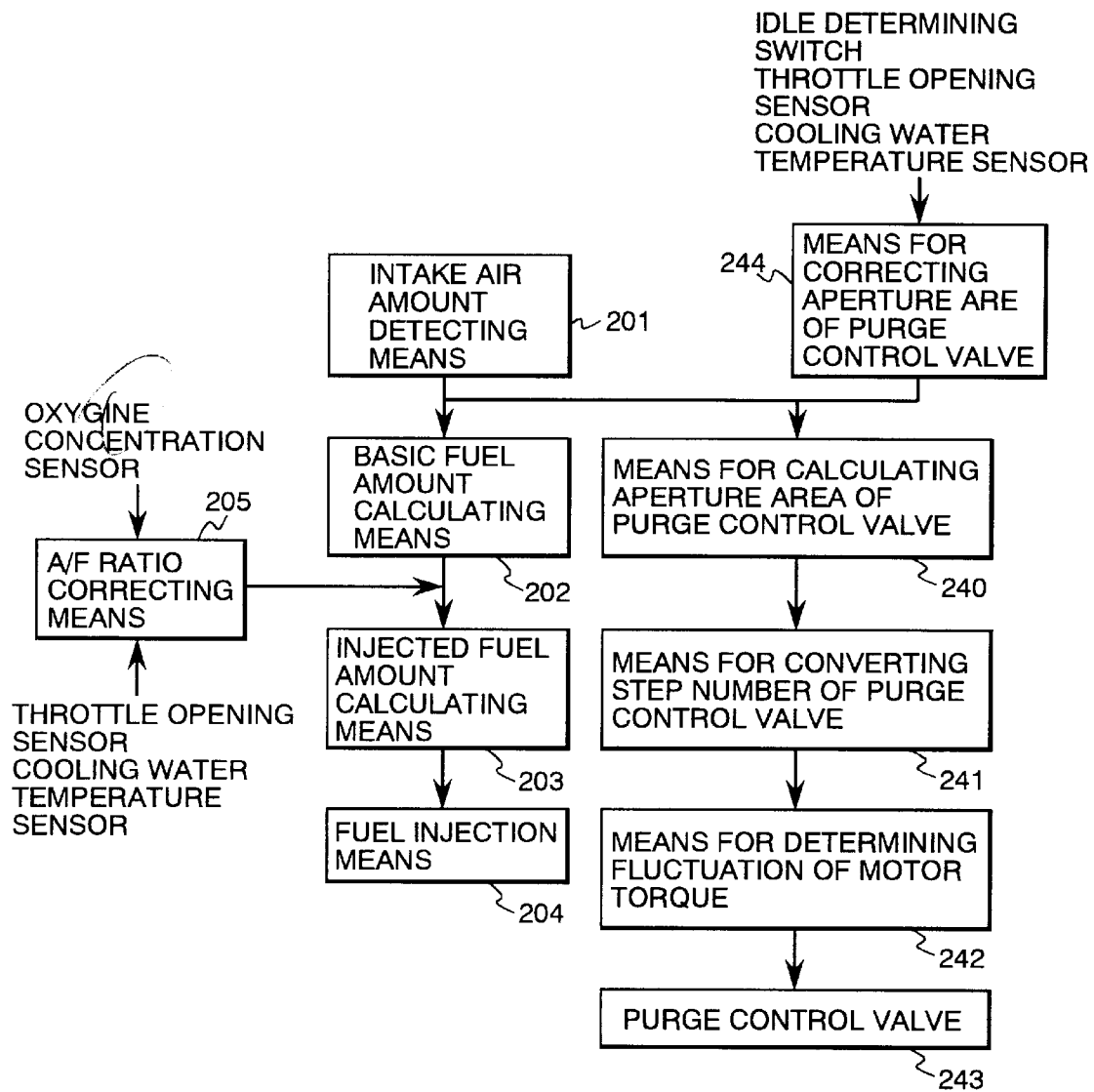
FIG. 14 is a block diagram showing an example of the whole configuration of an evaporation control unit.
Figure 15:
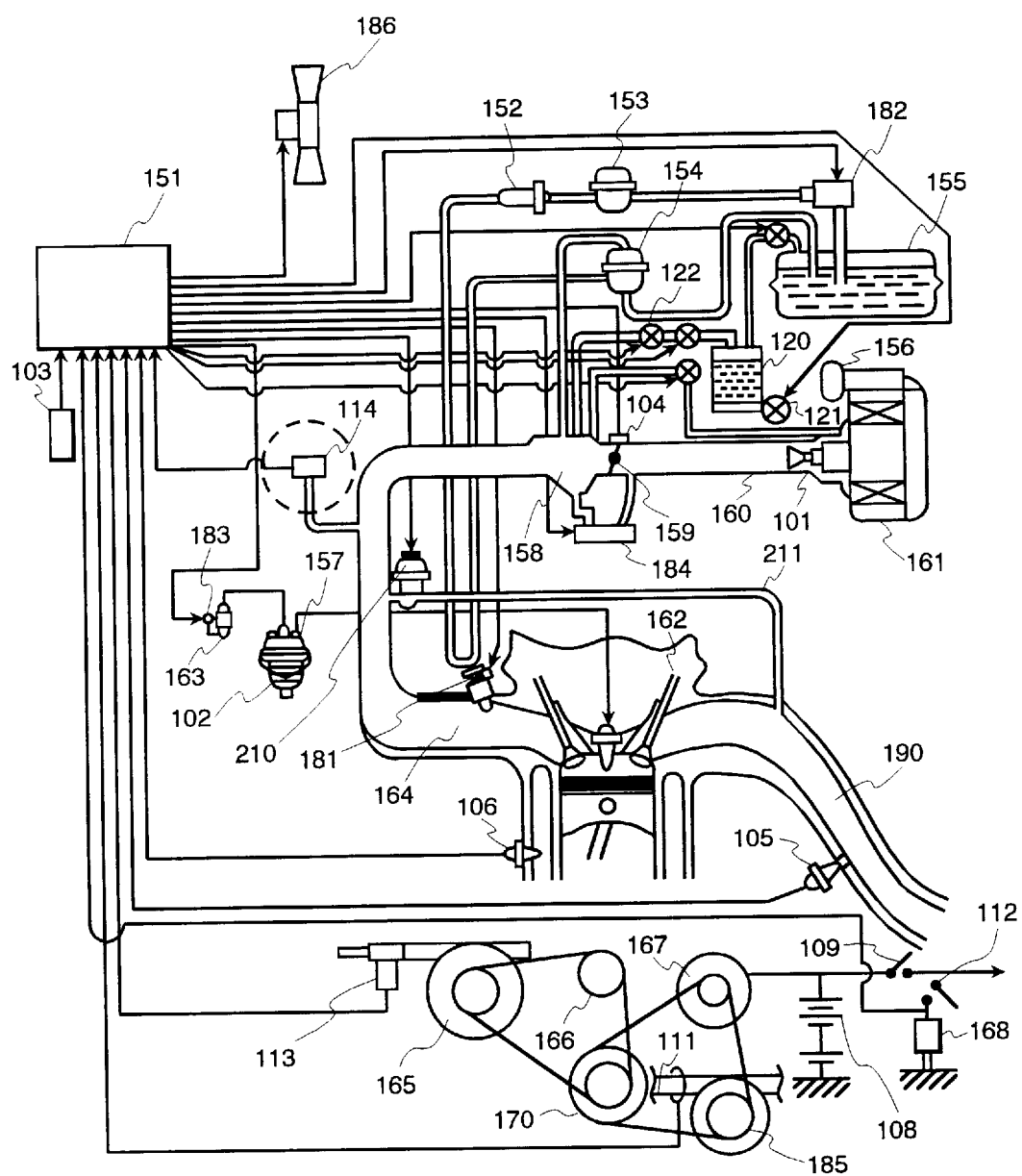
FIG. 15 shows a system of an internal combustion engine including the EGR control unit of the present invention.

FIG. 13 is a block diagram showing an example of the whole configuration of an idling speed control unit or ISC control unit, FIG. 14 is a block diagram showing an example of the whole configuration of an evaporation control unit, and FIG. 15 shows an example of a system of an internal combustion engine including the EGR control unit of the present invention.

An air flows through an air cleaner to an intake air detecting means or air flow meter 1. This air flow meter is a thermal wire type air flow sensor. After then, the air flows to a collector 158 through a duct 160, a throttle body 159 having a throttle valve for controlling an amount of the intake air, and an ISC valve 54 or flow control valve in the idling speed control unit provided so as to bypass the throttle body. Wherein the air is distributed into an intake pipe of each of cylinders directly connected to an engine, and taken in the cylinder. It should be appreciated that the load of the engine may be detected by measuring the pressure in the intake pipe using not the air flow meter 1 but the pressure sensor 14.

While, the fuel is taken-in from fuel oil tank by a fuel pump 182 and pressurized. The pressurized fuel passes through a fuel damper 153 and a fuel filter 152. After the differential pressure between a collector 158 and the upstream of the injector 51 is regulated to be at a constant by a regulator 154, the pressurized fuel is injected from the injector to the intake pipe.

The air flow meter 1 outputs a signal corresponding to the amount of the intake air. Further, a crank angle sensor 102 incorporated in a distributor 157 outputs a pulse every the predetermined crank angle. These outputs are input to a control unit 151, in which the crank angle and the engine speed are calculated.

A throttle sensor 4 for detecting the opening of the throttle valve is mounted on a throttle body 159. An output signal from the throttle sensor 4 is input the control unit 151 to detect the position where the throttle valve is fully closed and the acceleration.

A water temperature sensor 106 for detecting the temperature of the cooling water is mounted on an engine body 162. An output from the water temperature sensor 106 is input to the control unit 151 to detect a state of warming-up of the engine and set the target speed of a radiator fan at the ON-OFF idling.

The mixture of the fuel and the air burnt in the cylinder is emitted from the exhaust pipe 190 as exhaust gas. A part of the exhaust gas is regulated in its pressure by an exhaust gas circulating amount control means or an EGR valve 210 provided on the way of an exhaust gas circulation passage 211 which fluidly connects an exhaust pipe to an intake pipe 164, after then circulated to the intake pipe 164.

An A/F ratio sensor 5 is mounted on the exhaust pipe 190 of the engine to output a signal corresponding to the concentration of oxygen contained in the exhaust gas.

To prevent the emission of evaporated fuel to air, the evaporated fuel from the fuel oil tank 155 is adsorbed by activated charcoal in a canister 120.

The evaporated fuel adsorbed in the canister 120 is emitted into an air taken-in from one-way bulb provided upstream of a drain cut bulb 121 by the differential pressure between the fuel oil tank 155 and the intake pipe 164, and flown into the collector 158. Thereby the overflow of the canister 120 is prevented. Further, an air amount which contains the evaporated fuel having a constant ratio with respect to the intake air is supplied to the collector 158 under the control of a purge control valve 122 or flow control valve of the evaporated fuel control unit provided downstream of the canister 120.

Figure 16:
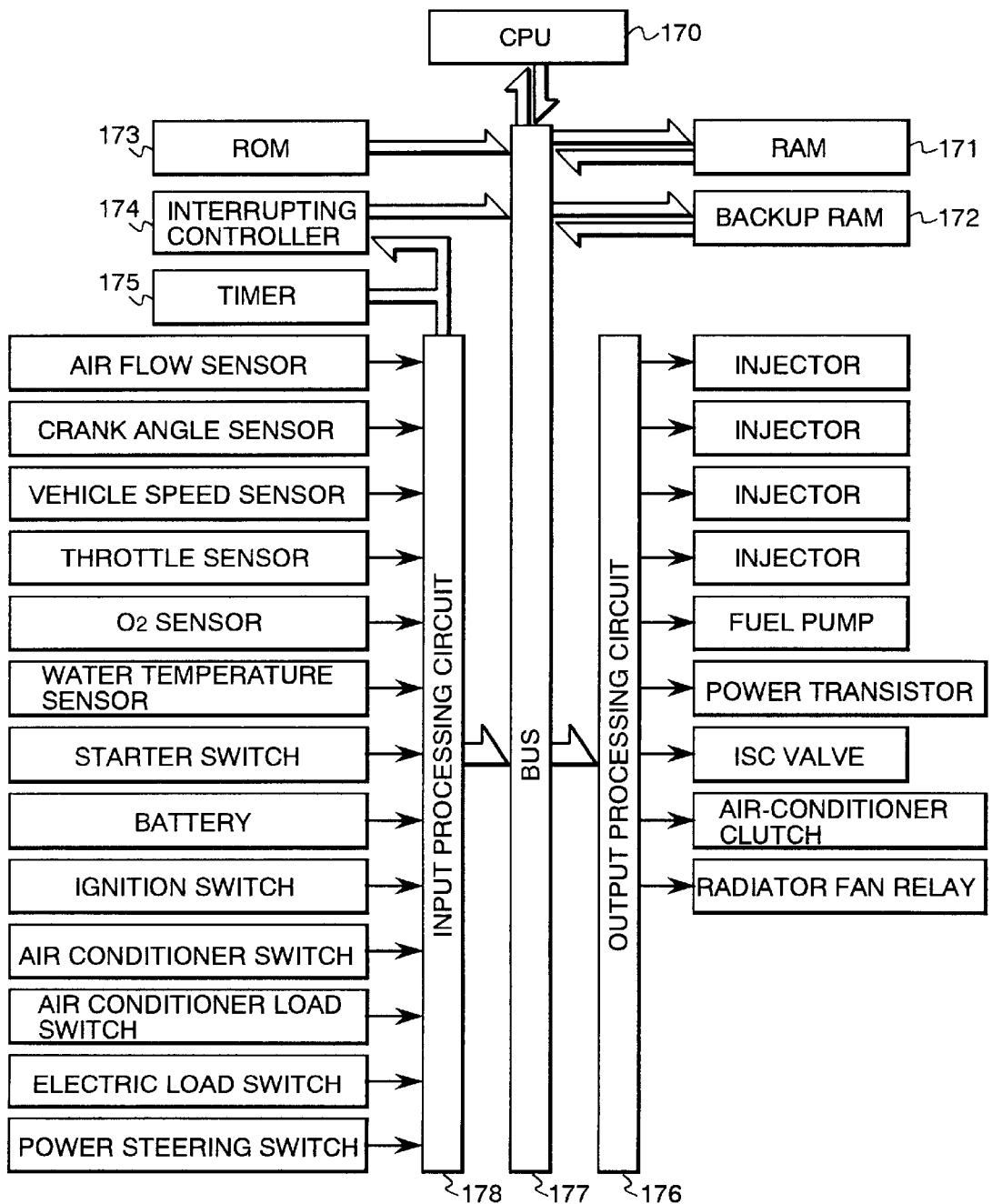
FIG. 16 shows an example of the configuration of the control unit.
Figure 17:
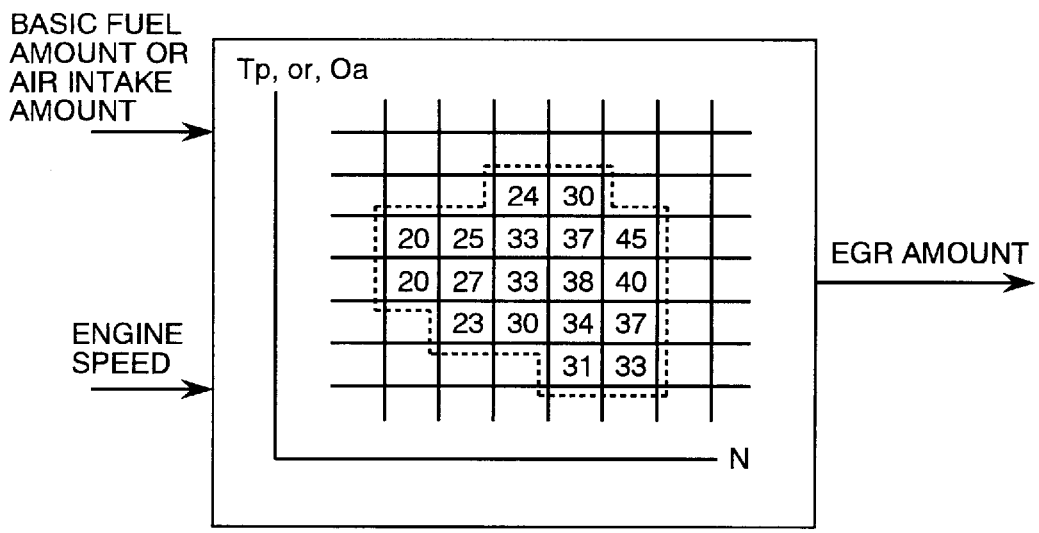
FIG. 17 shows an example of an EGR amount calculating means.

As shown in FIG. 16, the control unit 151 includes a CPU 170, a ROM 173, a RAM 171, a backup RAM 172, an interrupt controller 174, a timer 175, an input processing circuit 178 and an output processing circuit 176. These components are connected to one another by a BUS 177. The CPU 170 performs various kinds of processing using the RAM 171 and the backup RAM 173 which can hold the storage content even when an ignition key 9 is at an OFF state, based on programs stored in the ROM 173 and various kind of information processed in the input processing circuit 178. The CPU 170 can process the interrupt processing at any time by an interrupt instruction given from a controller 174, on the basis of information from the timer 175 or the input processing circuit 178.

Further, the control unit 151 performs the detection of an external load by using a power steering switch 113 to detect the load of an electric load switch for detecting the "ON" state of an electric load 168 and the load of a power steering 165. Furthermore, the control unit 151 controls the ON/OFF of a fuel pump 182, an air conditioner 185 and a radiator fan 186.

Referring to FIGS. 19 to 24, there are shown the relationship between step number of the EGR valve and variation parameter of the motor torque. FIG. 19 is a graph showing the relationship between an excitation state and the setting time at the time when the step number of the EGR valve changes from a large value to a small value and from the small value to a large value.

In order to control the EGR valve according to the target value of the step number, the excitation of the synchronous motor is performed as follows. When the target value of the step number is asynchronous with the monitored value of the step number calculated on the basis of an output signal output along the predetermined excitation pattern and by the synchronous motor drive pulse outputting means, the motor is driven in a two phase excitation way. When they are synchronous with each other, the motor is driven in a one phase excitation way to decrease an amount of heating of the motor part.

Where, by providing the setting time, it becomes possible to prevent that the timing of over-shoot of the rotor synchronizes with the timing at which the excitation pattern is shifted by the switch of the two phase excitation to the one phase excitation. because a magnetic field from the rotor does not repulse a magnetic field generated by the excitation of the stator, the motor torque never decrease remarkably and it becomes possible to prevent that the actual position of the valve departs from the monitored value of the step number (out-of-control).

Figure 20:
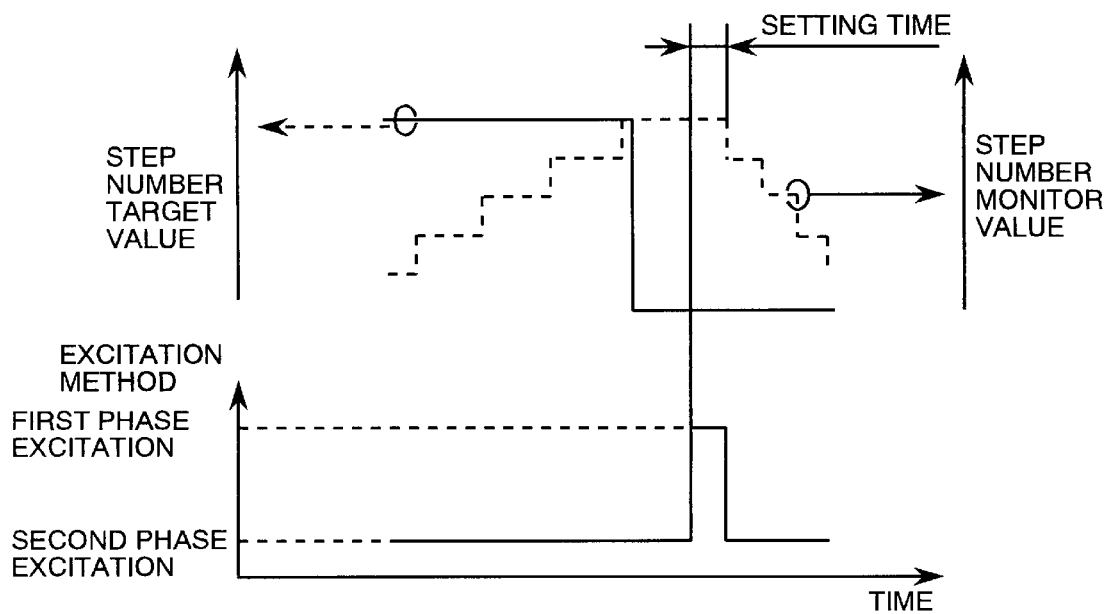
FIG. 20 is a graph showing the relationship between an excitation state and the setting time at the time when the step number of the EGR valve changes from a small value to a large value and from the large value to a small value.

FIG. 20 is a graph showing the relationship between an excitation state and the setting time at the time when the step number of the EGR valve changes from a small value to a large value and from the large value to a small value.

While single-side stress applied to the valve portion of the EGR valve increases the over-shoot of the motor rotor when the step number of the EGR valve changes from a large value to a small value and from the small value to a large value, it decreases the over-shoot when the step number of the EGR valve changes from a small value to a large value and from the large value to a small value. Therefore, when the step number changes from a small value to a large value and from the large value to a small value, the out-of-control does not occur even if the setting time is set shorter.

Figure 21:
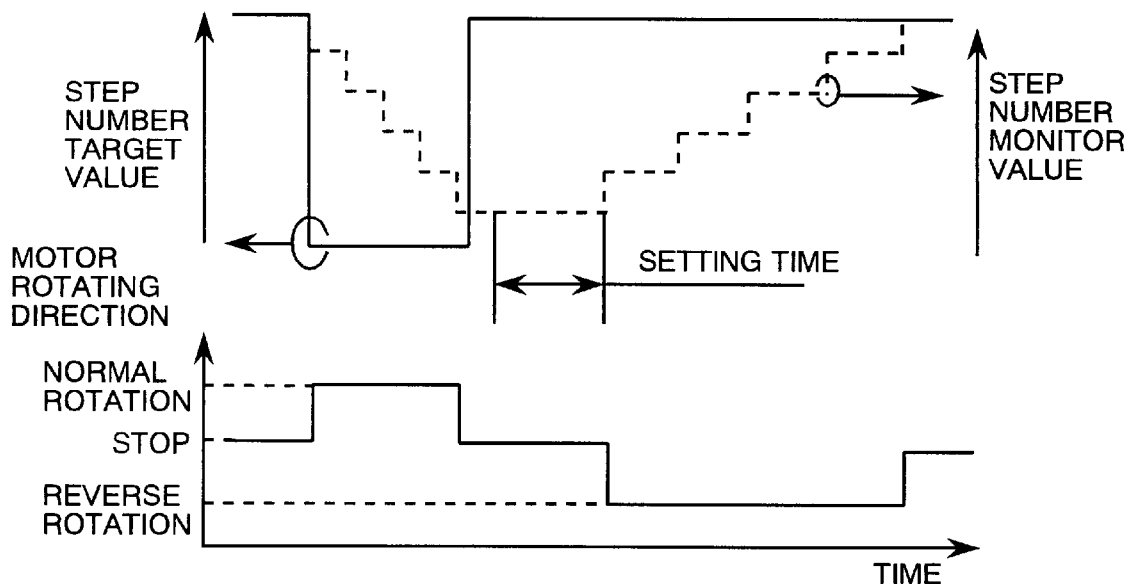
FIG. 21 is a graph showing the relationship between an motor rotating direction and the setting time at the time when the step number of the EGR valve changes.
Figure 22:
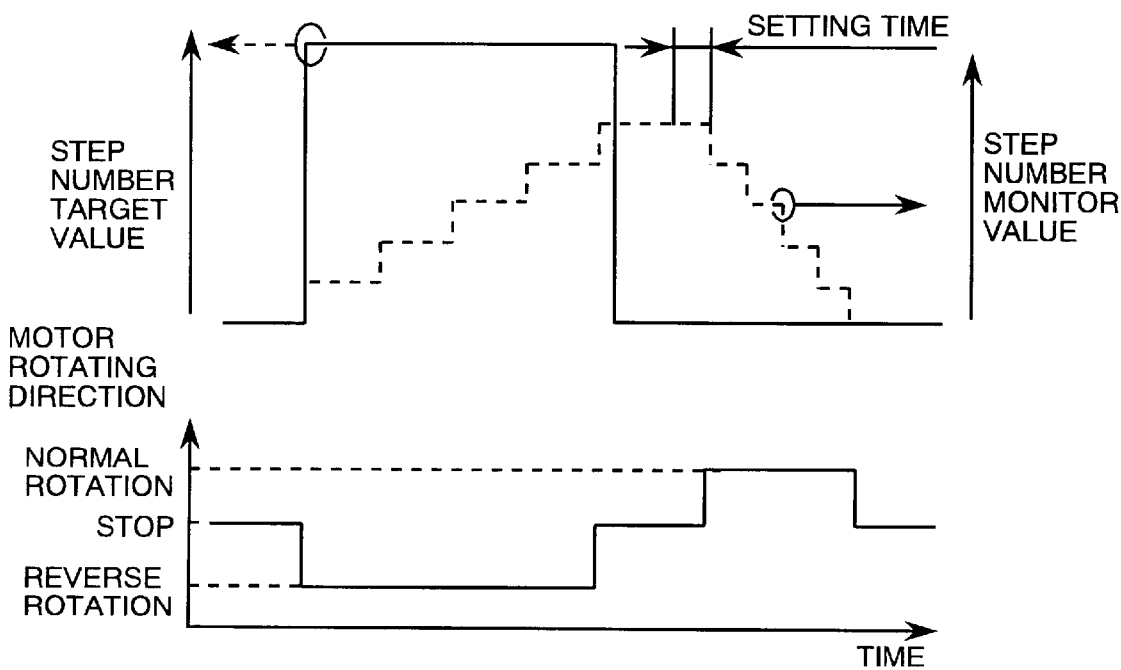
FIG. 22 is a graph showing the relationship between an motor rotating direction and the setting time at the time when the step number of the EGR valve changes.

FIGS. 21 and 22 show the relationship between an motor rotating direction and the setting time at the time when the step number of the EGR valve changes. The principle of the prevention of the out-of-control is the same as that of FIGS. 19 and 20. Therefore, the detailed description is abbreviated here.

Figure 23:
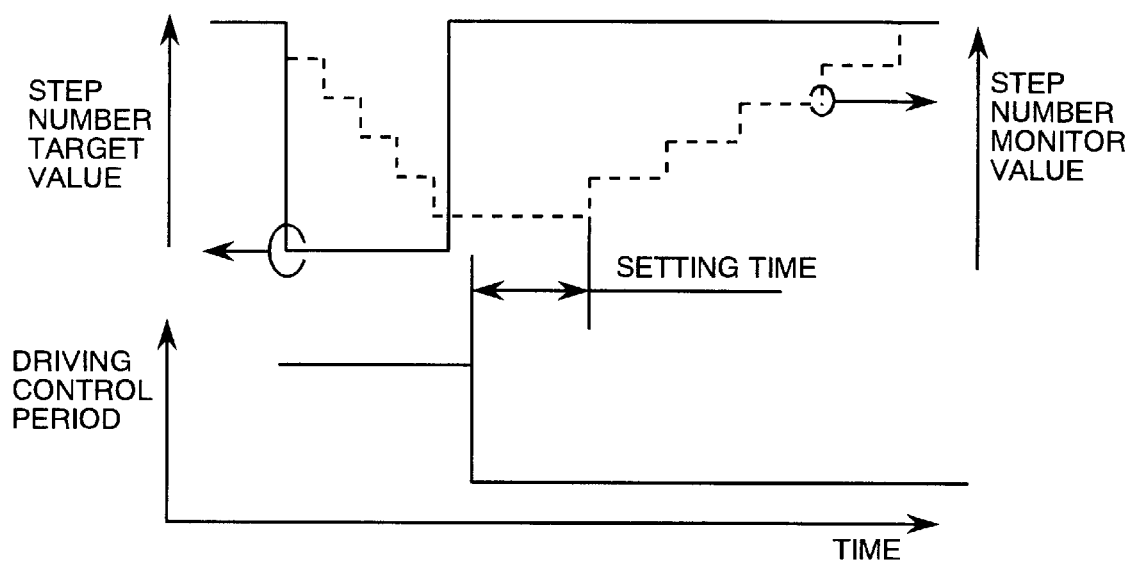
FIG. 23 is a graph showing the relationship between an drive control period and the setting time at the time when the step number of the EGR valve changes.
Figure 24:
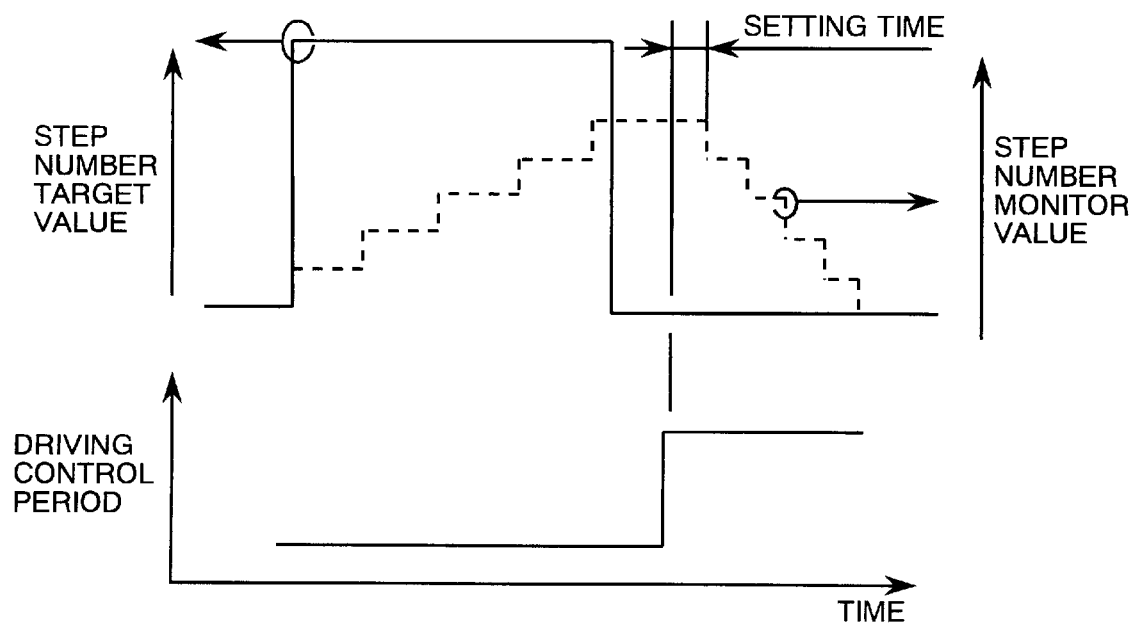
FIG. 24 is a graph showing the relationship between an drive control period and the setting time at the time when the step number of the EGR valve changes.

FIGS. 23 and 24 show the relationship between an drive control period and the setting time at the time when the step number of the EGR valve changes. The principle of the prevention of the out-of-control is the same as that of FIGS. 19 and 20. Therefore, the detailed description is abbreviated here.

FIGS. 25 to 28 shows examples of a flow chart representing a method of determine the setting time according to the variation of the motor torque.

Figure 25:
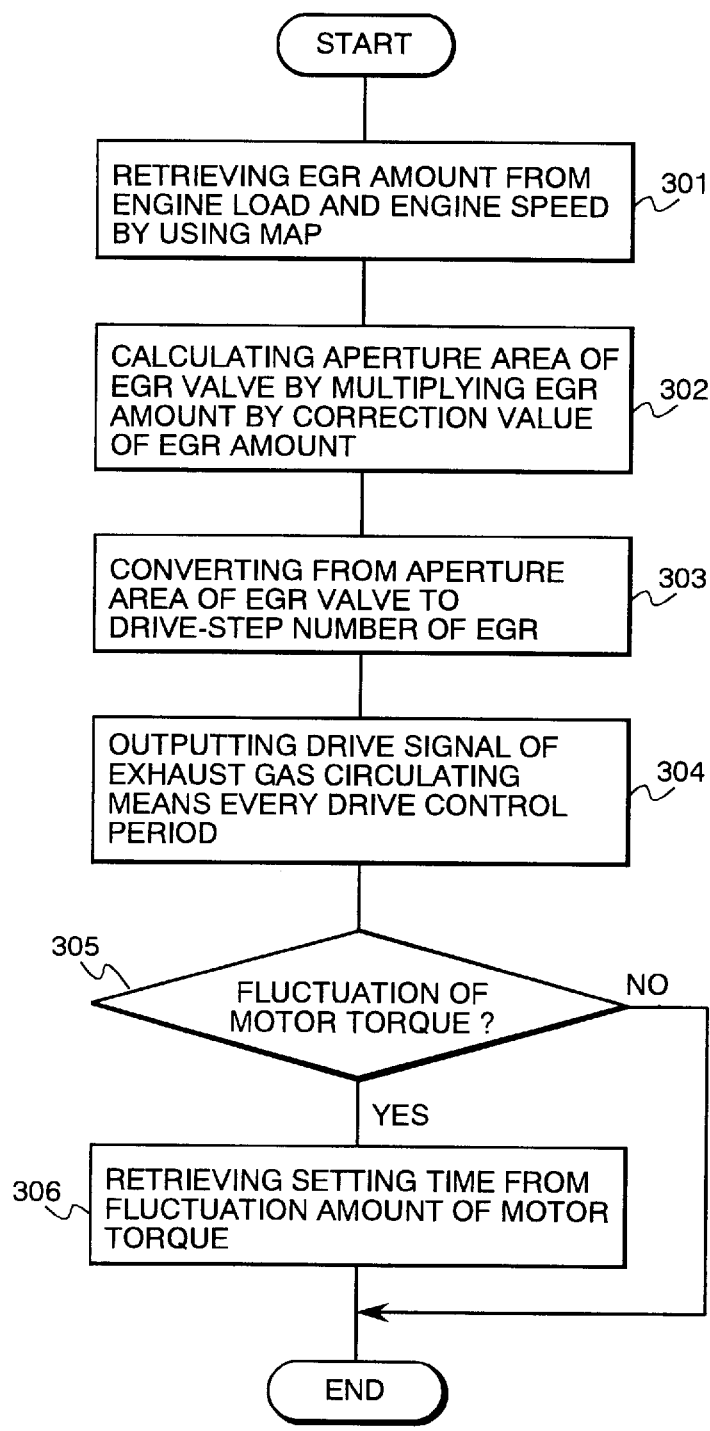
FIG. 25 is a flowchart showing the calculation of an amount of circulation of exhaust gas and the determination of the setting time.

FIG. 25 is a flow chart showing the calculation of an amount of circulation of exhaust gas and the determination of the setting time.

In step 301, the EGR amount is map-retrieved by using the load of the engine and the engine speed. Instep 302, a correction value of the EGR amount obtained on the basis of information from engine load conditions such as an idling determination switch, a throttle opening sensor, a cooling water temperature sensor, etc. is multiplied by the EGR amount. Thereby, an opening area of the EGR valve is obtained. Further, in step 303, the EGR valve opening area is converted into the EGR drive step number. In step 304, an output signal along the predetermined excitation pattern is output by a synchronous motor drive pulse output means, in order to control the EGR valve driven by a motor. In step 305, the variation in the motor torque is determined. If the variation in the motor torque is observed, the setting time corresponding to the magnitude of the variation in the motor torque is added to the output signal. the added signal is input to the EGR valve.

Figure 26:
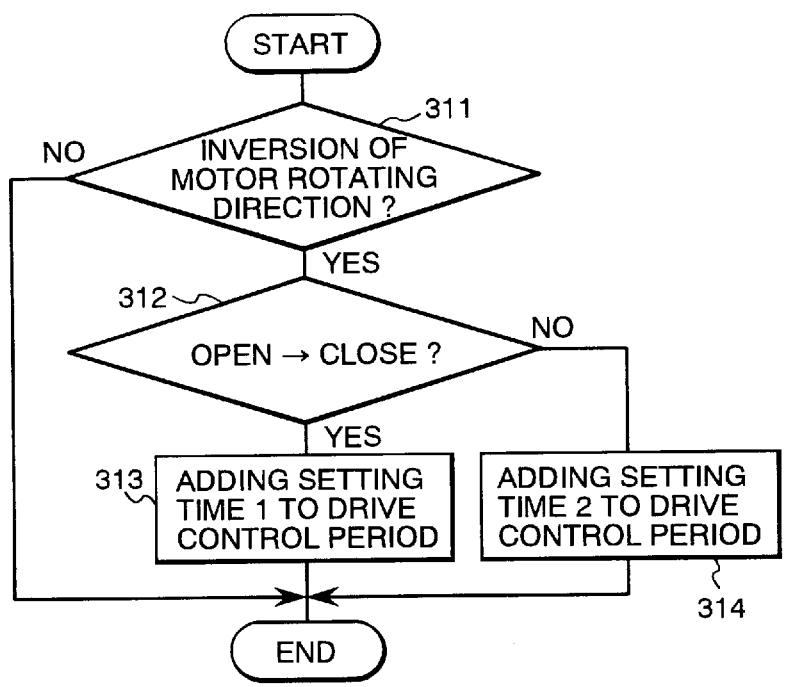
FIG. 26 is a flow chart showing a method of providing the setting time, in which the variation in the motor torque is determined by using the inversion of a motor rotating direction.

FIG. 26 is a flow chart showing a method of providing the setting time, in which the variation in the motor torque is determined by using the inversion of a motor rotating direction.

Whether or not a drive direction of an output signal output along the predetermined excitation pattern by the synchronous motor drive pulse output means is inverted, is determined in step 311. If inverted, the processing advances to step 312. In step 312, whether or not the drive direction of the output signal is inverted from a opening direction to a closing direction is determined. If it is inverted from a opening direction to a closing direction, the setting time is set shorter, and added to the drive control period. If it is inverted from a closing direction to a opening direction, the setting time is set longer, and added to the drive control period.(steps 313,314)

Figure 27:
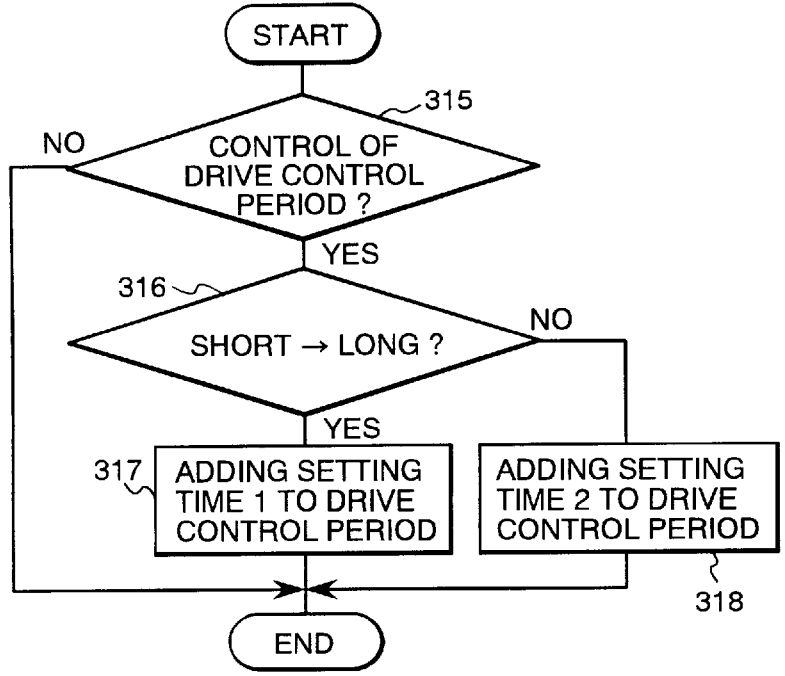
FIG. 27 is a flow chart showing a method of providing the setting time, in which the variation in the motor torque is determined by using the control of the drive control period.

FIG. 27 is a flow chart showing a method of providing the setting time, in which the variation in the motor torque is determined by using the control of the drive control period. In FIG. 27, a setting time determining method is like that of FIG. 26. Namely, in step 315, whether or not the drive control period is changed is determined. If changed, the processing advances to step 316. If changed at a long period, the processing advances from step 316 to step 317, and if changed at a short period, the processing advances to step 318.

Figure 28:
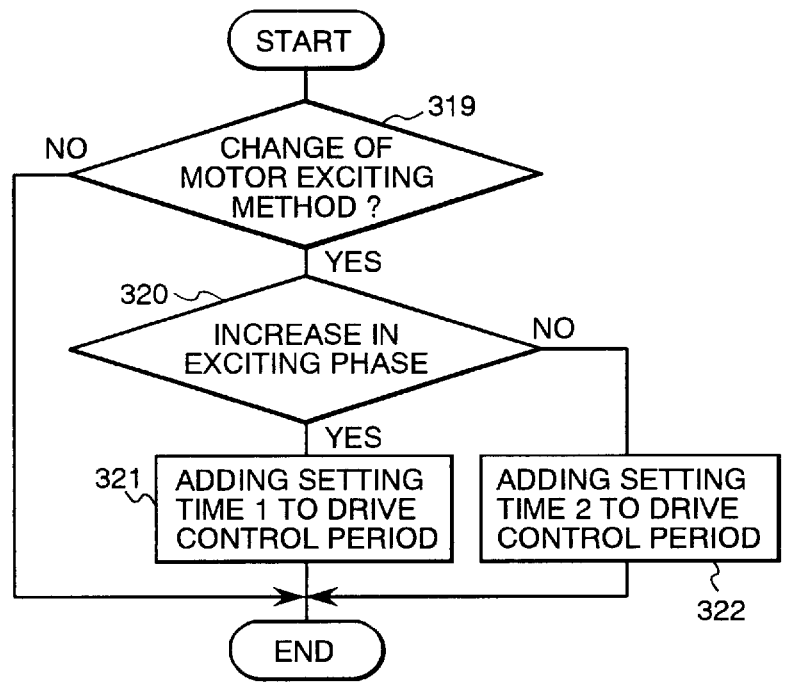
FIG. 28 is a flow chart showing a method of providing the setting time, in which the variation in the motor torque is determined by using the change of the motor exciting method.

FIG. 28 is a flow chart showing a method of providing the setting time, in which the variation in the motor torque is determined by using the change of the motor exciting method. a setting time determining method is similar to that of FIG. 26. Namely, the processing of steps 319, 320, 321 and 322 are performed.

Figure 29:
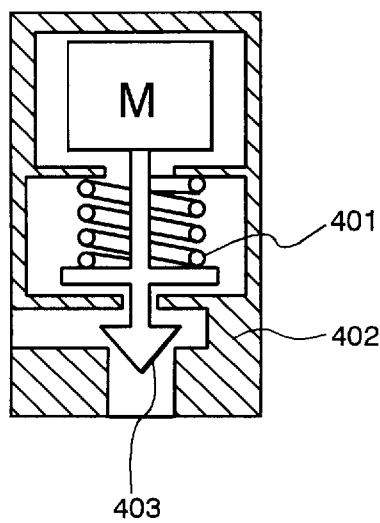
FIG. 29 shows the configuration of the EGR valve, in which the mechanism using the stress of a spring is used as means for providing single-side stress to a valve of the EGR valve.
Figure 30:
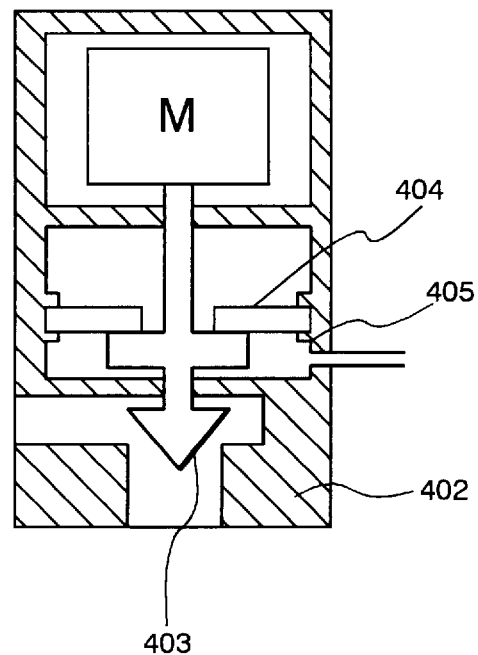
FIG. 30 shows the configuration of the EGR valve, in which the mechanism using the stress of a diaphragm is used as means for providing single-side stress to a valve of the EGR valve.
Figure 31:
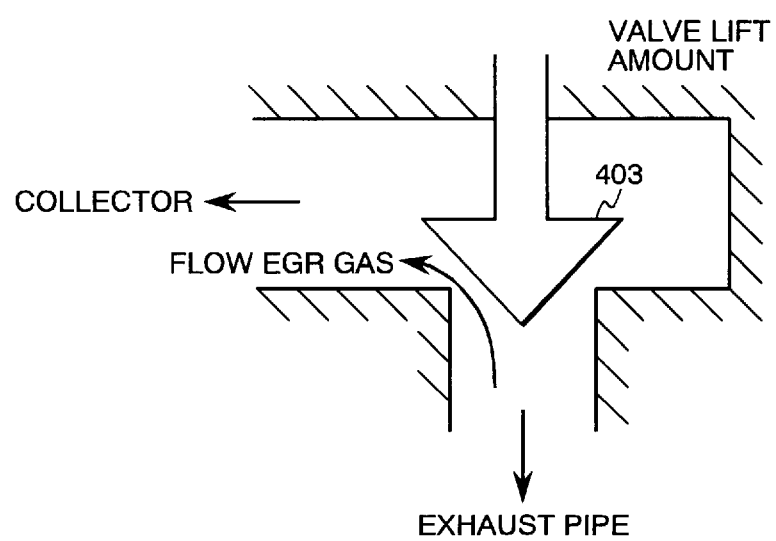
FIG. 31 shows an example of the relationship between an amount of valve lifting of the EGR valve and a negative pressure in an air intake pipe which acts on the valve.

FIGS. 29–31 show examples of the configuration of the EGR valve.

FIG. 29 shows the configuration of the EGR valve, in which the mechanism using the stress of a spring is used as means for providing single-side stress to a valve of the EGR valve.

One end of a spring 401 is fixed to a body 402, and the other end is contacted to a valve 403. The stress of the spring 401 is applied only to a opening direction in order to obtain a fail-safe function.

FIG. 30 shows the configuration of the EGR valve, in which the mechanism using the stress of a diaphragm is used as means for providing single-side stress to a valve of the EGR valve.

The outer radius of a diaphragm 404 is fixed to the body 402, and the inner radius of the diaphragm is fixed to the valve 403. By applying a negative pressure of the intake pipe to a negative-pressure chamber 405 configured of the diaphragm 404 and the body 402, the stress of the diaphragm 404 applies only to a opening direction of the valve 403 in order to obtain a fail-safe function.

FIG. 31 shows an example of the relationship between an amount of valve lifting of the EGR valve and a negative pressure in an air intake pipe which acts on the valve.

Figure 32:
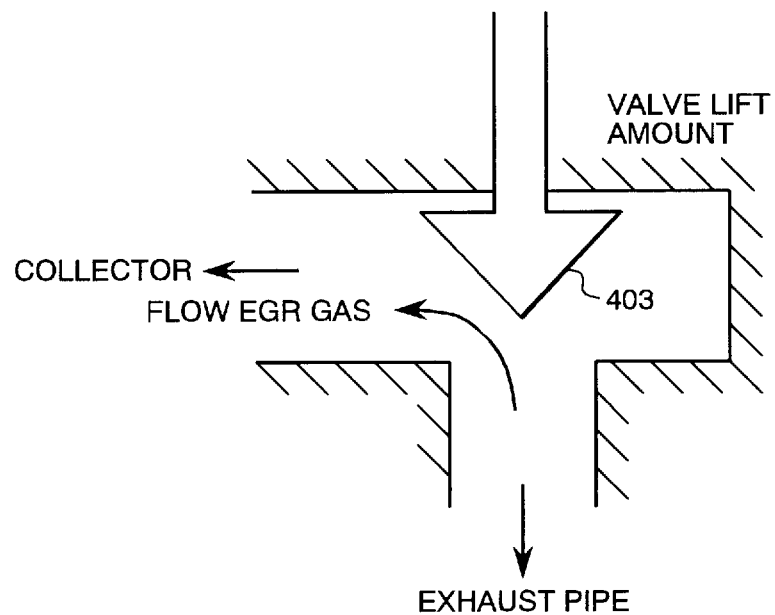
FIG. 32 shows another example of the relationship between an amount of valve lifting of the EGR valve and a negative pressure in an air intake pipe which acts on the valve.

Because the differential pressure between back and forth of the valve 403 is large when a lift amount of the valve is small as shown in FIG. 31, the negative pressure of the intake pipe applies only to a opening direction of the valve 403. While, because the differential pressure between back and forth of the valve 403 is negligible when a lift amount of the valve is large as shown in FIG. 32, the negative pressure of the intake pipe does not apply to a opening direction of the valve 403.

According to the present invention, even when the control unit has a failure, it is possible to open the flow control valve, and avoid over-application of the evaporation-purge, EGR and auxiliary intake air. Further, By adjusting the setting time to the drive period according to a state of variation of the motor torque, it becomes possible to prevent the out-of-control. Furthermore, by selecting one of at least two setting time, it is possible to prevent the deterioration of response. Accordingly, a vehicle using the present invention has good drivability, good emission performance and improved fuel consumption. Even when the flow control equipment has a failure, it is possible to prevent the extreme deterioration of drivability such as engine stall, etc.

We claim:

1. Flow control equipment for an engine, comprising a valve opening calculating means for calculating control parameters of fluid used in engine control, a flow control valve driven by a stepping motor for adjusting a controlled variable in accordance with an output signal corresponding to the control parameters of said valve opening calculating means, and means for applying a control frequency signal different from a predetermined normal control frequency signal to said flow control valve when operation of said flow control valve is shifted.

2. Flow control equipment for an engine, comprising a valve opening calculating means for calculating control parameters of fluid used in engine control, a control valve driven by a stepping motor, for adjusting a controlled variable in accordance with an output signal corresponding to the control parameters of said valve opening calculating means, and means for applying a resonance frequency vibration to said flow control valve when said flow control valve is shifted in a closing direction.

3. The flow control equipment according to claim 2, wherein normal frequency vibration is mixed with the resonance frequency vibration when said flow control valve is shifted in the closing direction.

4. The flow control equipment according to claim 2, further comprising means for determining said flow control equipment has departed from a predetermined normal operation by comparing a predetermined value set to at least one of a fluid temperature, a fluid pressure and a fluid flow with an actually measured value thereof, and means for detecting a closed or open state of said flow control valve by using a signal indicative of departure from the normal operation.

5. The flow control equipment according to claim 2, further comprising detecting means for detecting an abnormality of the flow control equipment, setting means for shifting said flow control valve in the closing direction when the abnormality is detected, measuring means for carrying out shift operation of said valve for the predetermined period of time, and applying and repeating application of the resonance frequency until said flow control valve reaches a fully closed state or the predetermined closed state.

6. Flow control equipment for an engine comprising a flow control valve driven by a stepping motor, for adjusting a controlled variable in accordance with an output signal corresponding to a control parameter of valve opening calculating means for calculating control parameters of fluid relevant to an engine control, and means for applying vibration which decreases sliding resistance, when said flow control valve is closing, to said flow control valve.

7. In flow control equipment, including gas flow controller provided at gas flow passage, said gas flow controller comprising a valve, a stepping motor for driving said valve, means for applying single-side stress to said valve, means for detecting the variation in torque of said motor, means for obtaining a setting time corresponding to the variation in the detected motor torque, and means for adding the obtained setting time to a drive period and for driving said motor.

8. The flow control equipment according to claim 7, wherein the setting time has two values corresponding to the variations in the motor torque.

9. Flow control equipment for an exhaust gas circulating control unit comprising, an exhaust gas circulating controller provided at an exhaust gas circulating passage connected fluidly to an exhaust pipe and an intake pipe, a stepping motor for driving said exhaust gas circulating control unit, means for applying single-side stress to a valve portion of said exhaust gas circulating control unit, and means for determining variation in the motor torque, wherein a setting time is added to a drive period when the motor torque varies, and the setting time has two values corresponding to the variations in the motor torque.

10. The flow control equipment according to claim 9, wherein said means for applying single-side stress to a valve portion of said exhaust gas circulating control unit includes the stress of a spring.

11. The flow control equipment according to claim 9, wherein said means for applying single-side stress to valve portion of said exhaust gas circulating control unit includes the stress of a diaphragm.

12. The flow control equipment according to claim 9, wherein said means for applying single-side stress to valve portion of said exhaust gas circulating control unit includes the negative pressure of an intake pipe.

13. The flow control equipment according to claim 7, wherein said means for determining the variation in the motor torque determines the variation in the motor torque by excitation switching.

14. The flow control equipment according to claim 7, wherein said means for determining the variation in the motor torque determines the variation in the motor torque by the inverse of a rotational direction.

15. The flow control equipment according to claim 7, wherein said means for determining the variation in the motor torque determines the variation in the motor torque by drive control period switching.

16. Flow control apparatus for an idling speed control unit having a bypass passage through which the air measured by an air flow meter is supplied to an engine without passing the throttle valve, and a flow control valve provided on the way of said bypass passage, comprising means for determining motor torque variation, wherein said flow control valve is driven by a stepping motor and has means for applying single-side stress to a valve portion of said flow control valve and means for determining the variation in the motor torque, and setting time is added to a drive period when the motor torque varies, the setting time having two values corresponding to the variations in the motor torque.

17. Flow control equipment for an evaporated fuel amount control unit having a stepping-motor-driven flow control valve provided at an exhaust gas circulating passage connected fluidly to an exhaust pipe and an intake pipe, means for determining variation in the motor torque, means for applying single-side stress to a valve portion of said flow control valve, and means for determining variation in the motor torque, wherein setting time is added to a drive period when the motor torque varies, the setting time has two values corresponding to the variations in the motor torque.

* * * * *